United States Patent
Srivastava et al.

(10) Patent No.: US 7,797,334 B2
(45) Date of Patent: Sep. 14, 2010

(54) AUTOMATED DOWNLOADING FROM MAINFRAME TO LOCAL AREA NETWORK

(75) Inventors: Santosh Kumar Srivastava, Raebareli (IN); Sathish Babu Namasivayam, Chennai (IN); Mahipal Pukhraj Jain, Chennai (IN)

(73) Assignee: Infosys Technologies Ltd., Bangalore (IN)

( * ) Notice: Subject to any disclaimer, the term of this patent is extended or adjusted under 35 U.S.C. 154(b) by 102 days.

(21) Appl. No.: 11/614,072

(22) Filed: Dec. 20, 2006

(65) Prior Publication Data
US 2007/0174294 A1 Jul. 26, 2007

(30) Foreign Application Priority Data
Jan. 9, 2006 (IN) .............................. 41/CHE/2006

(51) Int. Cl.
G06F 17/30 (2006.01)
G06F 7/00 (2006.01)
(52) U.S. Cl. .................. 707/770; 707/812; 707/959; 707/966; 709/201; 717/103; 717/121
(58) Field of Classification Search ................ 707/10
See application file for complete search history.

(56) References Cited
U.S. PATENT DOCUMENTS 5,799,286 A * 8/1998 Morgan et al. ................ 705/30
5,872,909 A * 2/1999 Wilner et al. ................. 714/38
2004/0148611 A1* 7/2004 Manion et al. .............. 719/328
2006/0101443 A1* 5/2006 Nasr ........................... 717/163

OTHER PUBLICATIONS

John Posner, CaseVision/ClearCase User's Guide, Silicon Graphics Inc/Atria Software Systems Inc, 1994, pp. 1-403, Document No: 007-2369-001.*
AllFusion Endevor Change Manager Supplemental Products:Options, Computer Associates International, Inc., accessed Oct. 18, 2006, 2 pages.
AllFusion® Endevor® Change Manager Implementation Guide r7, Computer Associates International, Inc., Feb. 2005, 86 pages.
AllFusion® Endevor® Change Manager, Frequently Asked Questions, Computer Associates International, Inc., 2005, 1 page.
Borza, Enterprise Change Management 101, CA Whitepaper, Aug. 2005, 5 pages.
"Chapter 5: Using the PowerBuilder ENDEVOR Interface," Sybase Manual at manuals.sybase.com, visited Nov. 24, 2006, 12 pages.

(Continued)

Primary Examiner—Greta L Robinson
Assistant Examiner—James J Wilcox
(74) Attorney, Agent, or Firm—Klarquist Sparkman, LLP

(57) ABSTRACT

A tool can automate the process of downloading from a mainframe to a local area network (LAN). A back-end tool and a front-end tool can cooperate to accomplish the downloading process. Both tools can simplify the download process, avoiding complications and common errors. A user interface can provide features for simplifying the download process. Files can be downloaded from separate sub-areas on the mainframe to respective separate sub-areas on the LAN. Download settings can be saved and later retrieved via a name. Downloading for multiple software projects can be supported.

25 Claims, 25 Drawing Sheets

OTHER PUBLICATIONS

Data Set (IBM mainframe) Wikipedia, Dec. 11, 2006, 2 pages.
Dueckman, CA's On-going Commitment to the Eclipse Foundation and Mainframe Platform, CA Whitepaper, Aug. 2006, 6 pages.
Endevor Quick Reference Guide, SYS-ED Course Materials, accessed Oct. 18, 2006, 2 pages.
FrontPage® 2003 Product Guide, Microsoft Corporation, 2003, 27 pages.
"How to use the Briefcase Feature in Windows XP," support.microsoft.com, visited Nov. 22, 2006, 3 pages.
Introduction to Partitioned Data Set, CNS UF Computing & Networking Services, visited Nov. 22, 2006, 2 pages.
Ipswitch WS_FTP Professional 2007 Tools Guide, Jun. 2006, 70 pages.
Legacy Value Restoration, Cognizant Technology Solutions, visited Oct. 26, 2006, 54 pages.
McAnally et al., "MVS Uploading and Downloading via FTP," Northern Illinois University, http://www.its.niu.edu/its/CSupport/upload.shtml, visited Dec. 11, 2006, 4 pages.
Secure FTP with FASTRANS and FAST Download, University of Washington, http://www.washington.edu/admin/adminsystems/secureftp-fasusers.html, visited Dec. 11, 2006, 1 page.
SEEC Announces SEEC Mosaic Studio for Legacy Transformation, Business Wire, Jun. 13, 2000, 2 pages.
SEEC Application Manager, SEEC, Inc., 2005, 2 pages.
SEEC Mosaic Studio: Unlock the Power for e-Business, visited Oct. 27, 2006, 4 pages.
Walrad et al., The importance of branching models in SCM, *Computer* On pp. 31-38, vol. 35, Issue: 9, Sep. 2002.
Posner, "CASEVision/ClearCase User's Guide," 1994, pp. 1-403, 403 pages.

* cited by examiner

BACK-END USER INTERFACE 1510

WELCOME TO THE SCM TOOL.

PROJECT NAME? TEST1
HIGH LEVEL QUALIFIER? T24242.INDHUJA
NUMBER OF DAYS? 30

FIG. 15

AUTOMATED DOWNLOADING FROM MAINFRAME TO LOCAL AREA NETWORK

BACKGROUND

Software development is notoriously difficult, and software development in a mainframe environment has its own particular challenges. For a variety of reasons, many tools for analyzing mainframe software do not run on the mainframe, but rather run on microcomputers, which are typically part of a local area network (LAN). As a result, a development team may wish to use computers on the LAN to analyze the mainframe software as it is modified.

Before the software can be analyzed on the LAN, it must at some point be transferred from the mainframe to the local area network. Analysis can then proceed. However, problems can arise if careful attention is not paid to the transfer process. Code on the LAN may not be the same as the mainframe code.

After the software is transferred to the LAN, changes may be made. For example, in a software development situation, changes may be made to the source code or other items. Analysis on the outdated files is a waste of time because the analysis should take place on the latest files.

Because of the difficulty, effort, and time involved in transferring the software from the mainframe to the LAN, a developer may forget or prefer not to keep a careful watch on the software on the LAN to make sure that it is not outdated. Accordingly, there remains room for improvement in techniques for keeping the files up to date. Such techniques can also be used in other scenarios in which transfer of files from a mainframe to a LAN are desired.

SUMMARY

A variety of techniques can be used for automating download of files from a mainframe to a LAN. For example, a back-end tool on a mainframe and a front-end tool on a LAN can work together to accomplish efficient transfer of the files.

The files can be placed in an intermediate storage area on the mainframe. If desired, the files can be separated into sub-areas in the intermediate storage area. For example, the files can be stored in respective sub-areas according to file type, project, or an element type associated with the file.

The back-end tool on the mainframe can accept parameters and use the parameters to take appropriate action to place the files in the intermediate storage area. For example, the back-end tool can interface with a software configuration management tool to export files into the intermediate storage area.

The front-end tool on the LAN can retrieve download settings saved earlier and use the download settings to take appropriate action to retrieve the files from the intermediate storage area. For example, the front-end tool can retrieve the files from the sub-areas in the intermediate storage area on the mainframe to respective sub-areas in a storage area on the LAN.

The front-end tool can provide a variety of user interface features that make transfer more convenient and accurate. For example, download settings for a project can be saved and retrieved without having to re-type the download settings. Download settings for multiple projects can be saved. Downloading can be initiated with a click of a graphical button of a user interface. For example, downloading for one or more projects can be initiated with a click of the graphical button. A variety of other features can be provided.

Reports can be provided (e.g., in back-end, front-end, or both processes) so that an audit of files which have been exported for download can be easily performed, thus avoiding various problems with the download process.

A simple, user-friendly user interface can be presented to avoid hesitation in performing the download and to avoid common errors. The cost and time savings offered by the technologies can be great because the process can be performed properly the first time instead of repeating a time-consuming download process.

As described herein, a variety of other features and advantages can be incorporated into the technologies as desired.

The foregoing and other features and advantages will become more apparent from the following detailed description of disclosed embodiments, which proceeds with reference to the accompanying drawings.

BRIEF DESCRIPTION OF THE FIGURES

FIG. 15 is a screen shot of an exemplary user interface presented by a back-end tool, such as that shown in FIG. 13.

DETAILED DESCRIPTION

EXAMPLE 1

Exemplary System Employing a Combination of the Technologies

Figure 1:
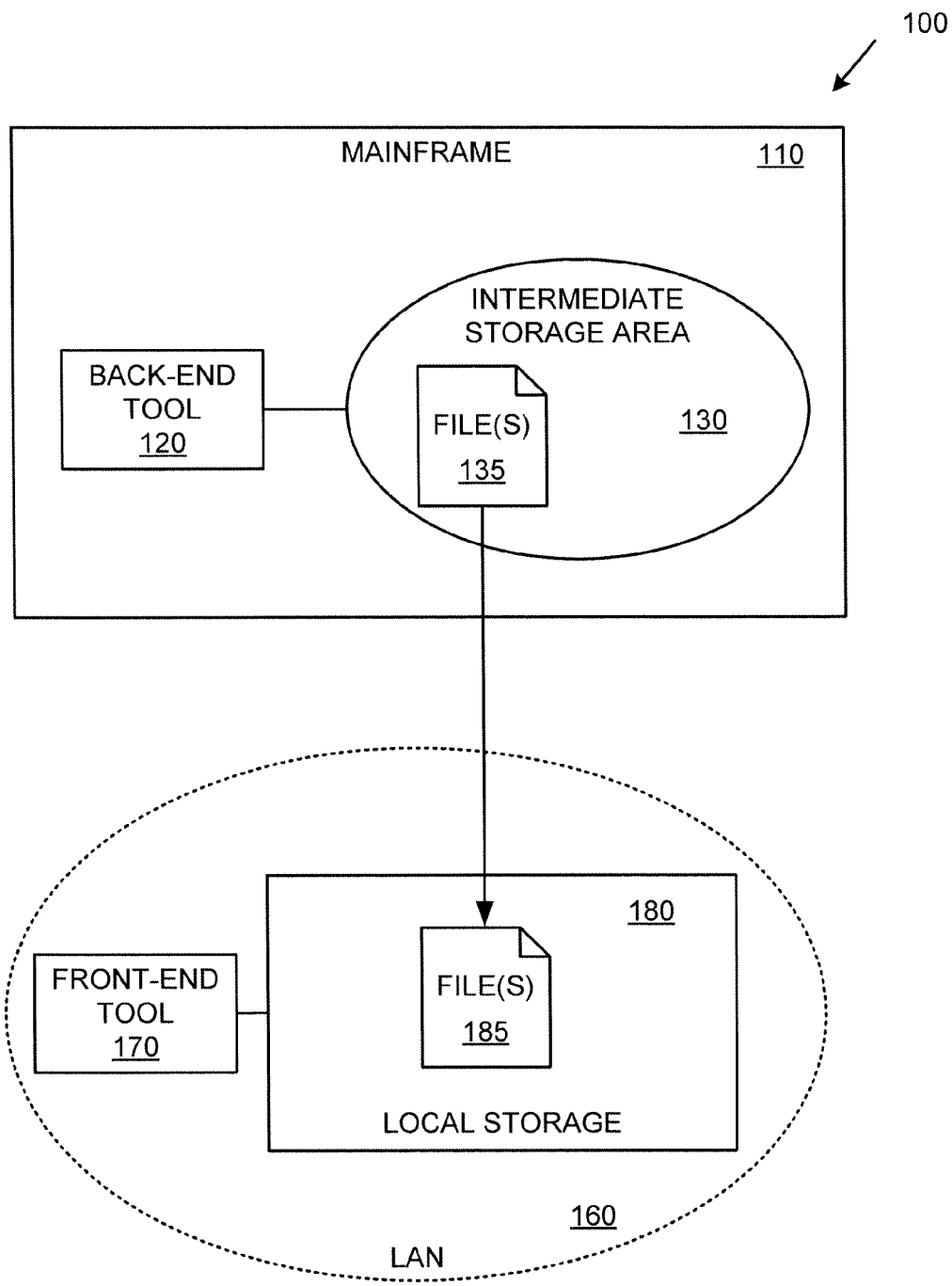
FIG. 1 is a block diagram of an exemplary downloading system that includes a back-end tool on a mainframe and a front-end tool on a local area network (LAN).

FIG. 1 is a block diagram of an exemplary downloading system 100 that includes a back-end tool 120 on a mainframe 110 and a front-end tool 170 on a local area network (LAN) 160.

In the example, one or more files 135 are stored in an intermediate storage area 130. Any of the technologies described herein can be used to place the files 135 in the intermediate storage area 130 and then download the files 135 to a local storage area 180 in a LAN 160. One or more files 135 are thus replicated as downloaded copies in the form of the one or more respective files 185.

In practice, the system 100 can be more complicated, with additional tools, files, areas, local storage, LANs, and the like.

EXAMPLE 2

Exemplary Method Employing a Combination of the Technologies

Figure 2:
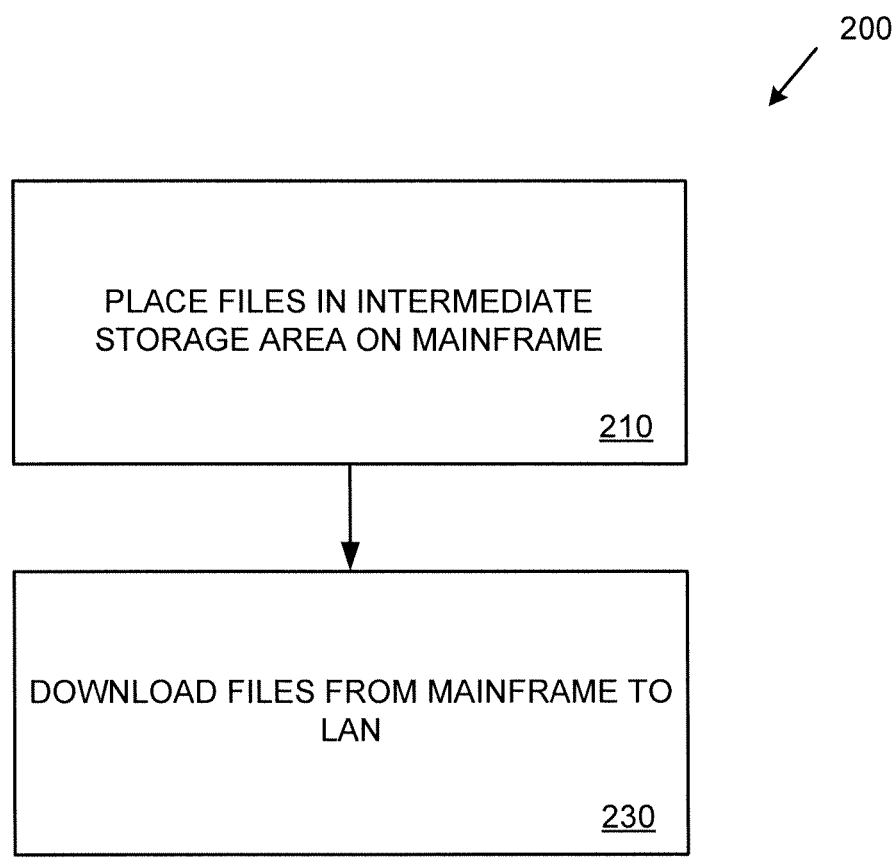
FIG. 2 is a flowchart of an exemplary method of downloading files from a mainframe that can be implemented in a system such as that shown in FIG. 1.

FIG. 2 is a flowchart of an exemplary method 200 of downloading files from a mainframe that can be implemented in a system such as that shown in FIG. 1. In the example, the files are placed in an intermediate storage area on the mainframe at 210. At 230, the files are downloaded from the mainframe to the LAN.

The method 200 and any of the methods described herein can be performed by computer-executable instructions stored in one or more computer-readable media (e.g., storage media).

EXAMPLE 3

Exemplary Detail of Mainframe Side

Figure 3:
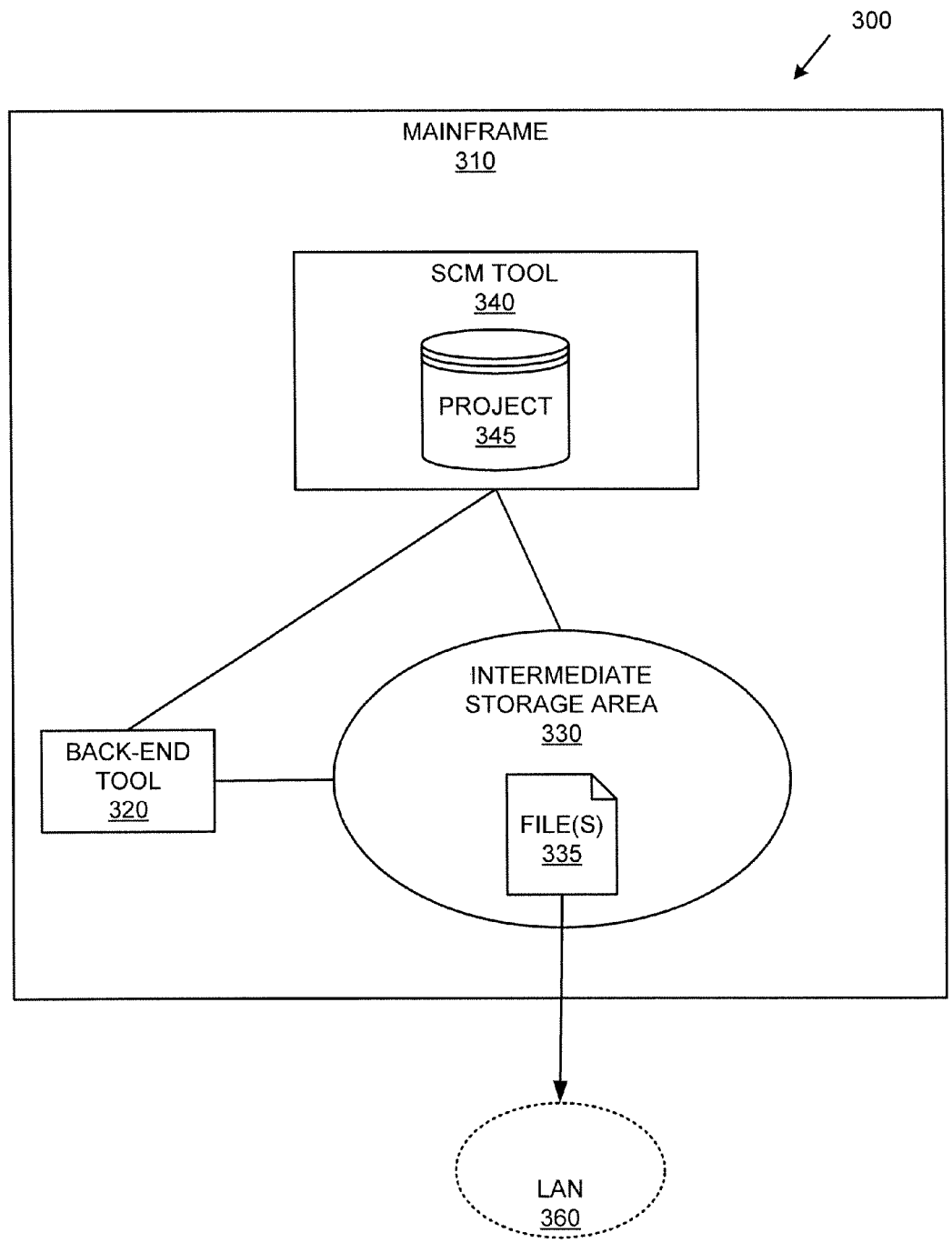
FIG. 3 is a block diagram showing the mainframe side of an exemplary code downloading system that includes a back-end tool, a software configuration management tool, and an intermediate storage area.

FIG. 3 is a block diagram showing the mainframe 310 side of an exemplary code downloading system 300 that includes a back-end tool 320, a software configuration management ("SCM") tool 340, and an intermediate storage area 330.

In the example, an SCM tool 340 is shown with one or more projects 345. If desired, software elements from the project 345 can be exported as one or more files 335 and stored in the intermediate storage area 330. Export can be accomplished by the back-end tool 320 or manually.

In practice, the SCM tool can be provided by a third party and not considered part of the download system (e.g., not included with the software implementing the back-end tool 320).

Creation of the intermediate storage area 330 can be achieved by the back-end tool 320 or created manually. As shown, the area 330 can include the one or more files 335, which can be downloaded to storage on the LAN 360.

EXAMPLE 4

Exemplary Method of Mainframe Side

Figure 4:
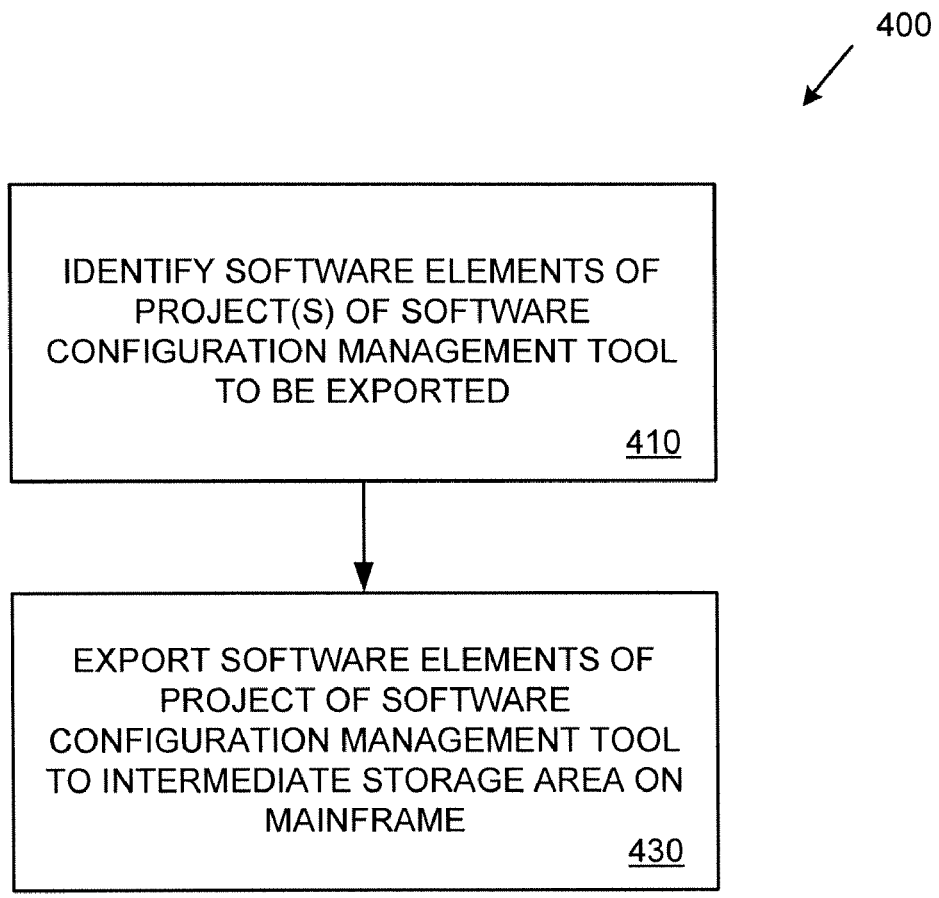
FIG. 4 is a flowchart of an exemplary method of preparing files for download and can be performed, for example, by a mainframe such as that shown in FIG. 3.

FIG. 4 is a flowchart of an exemplary method 400 of preparing files for download, and can be performed, for example, by a mainframe such as that shown in FIG. 3. In the example, the software elements of one or more projects of the SCM tool to be exported are identified at 410.

At 430, the software elements of the one or more projects of the SCM tool are exported (e.g., as files) to an intermediate storage area on the mainframe. In practice, a software element can be stored as a file (e.g., each software element for a project can be a different file).

EXAMPLE 5

Exemplary Detail of LAN Side

Figure 5:
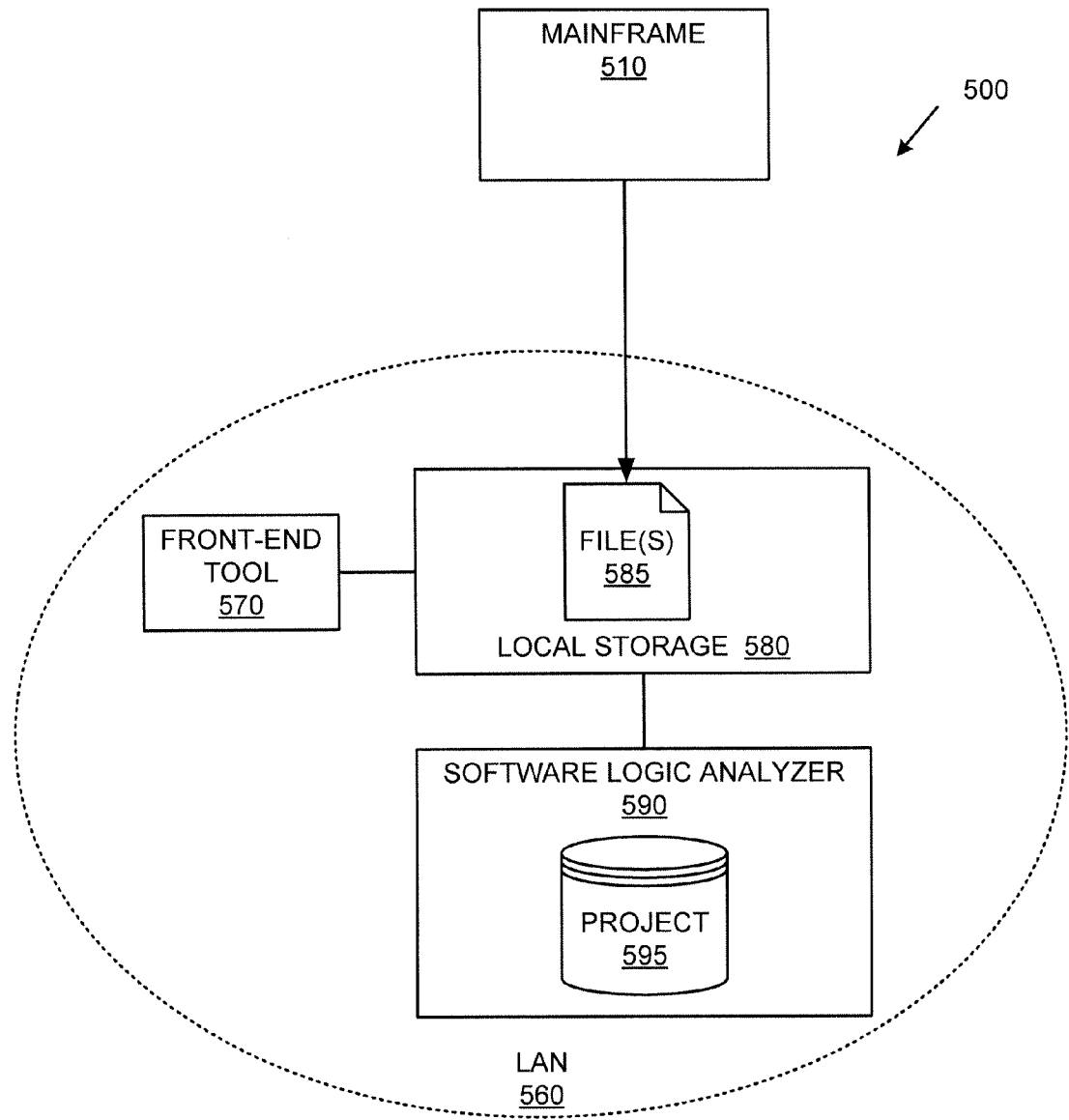
FIG. 5 is a block diagram showing the LAN side of an exemplary code downloading system that includes a front-end tool, a local storage area, and a software logic analyzer.

FIG. 5 is a block diagram showing the LAN 560 side of an exemplary code downloading system 500 that includes a front-end tool 570, a local storage area 580, and a software logic analyzer 590.

In the example, a software logic analyzer 590 is shown with one or more projects 595. In practice, the software logic analyzer 590 can be provided by a third party and not considered part of the download system (e.g., not included with the software implementing the front-end tool 570).

Creation of the storage area 580 can be achieved by the front-end tool 570 or created manually. As shown, the storage area 580 can include one or more files 585, which can have been downloaded to the storage area 580 from the mainframe 510.

EXAMPLE 6

Exemplary Method of LAN Side

Figure 6:
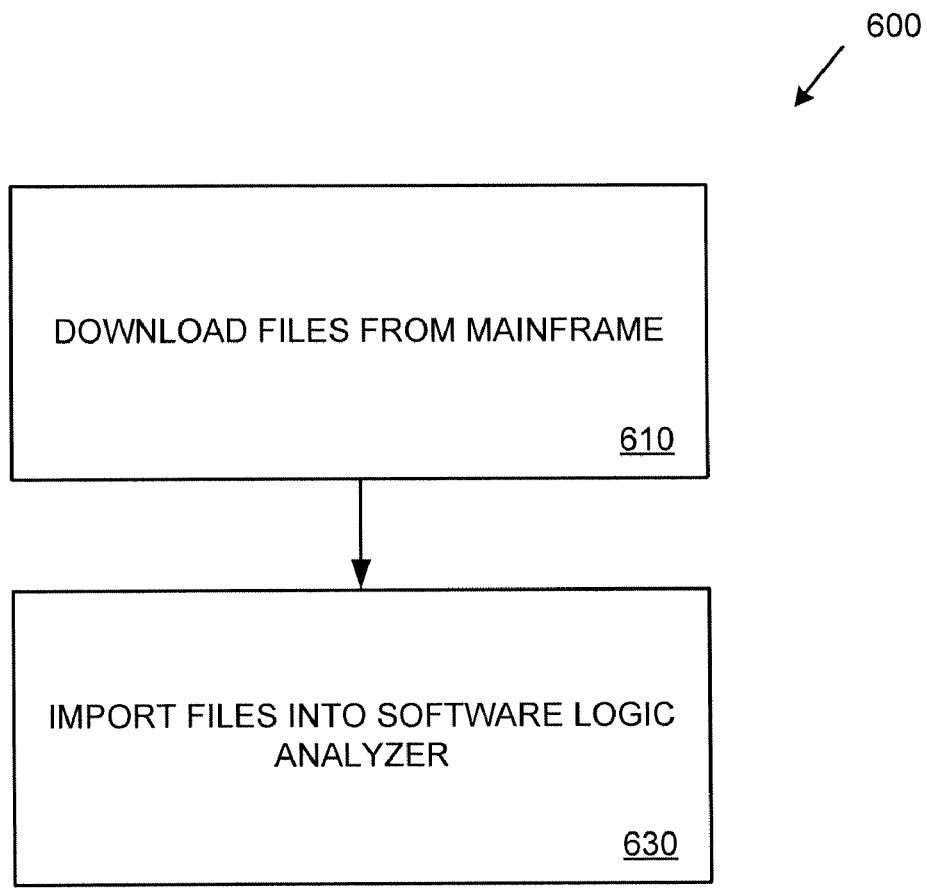
FIG. 6 is a flowchart of an exemplary method of downloading files and can be performed, for example, by a computer on a LAN such as that shown in FIG. 5.

FIG. 6 is a flowchart of an exemplary method 600 of downloading files and can be performed, for example, by a computer on a LAN such as that shown in FIG. 5. In the example, the files are downloaded from a mainframe at 610.

At 630, the files are imported into a software logic analyzer.

EXAMPLE 7

Exemplary System for Downloading Files from Separate Sub-areas

Figure 7:
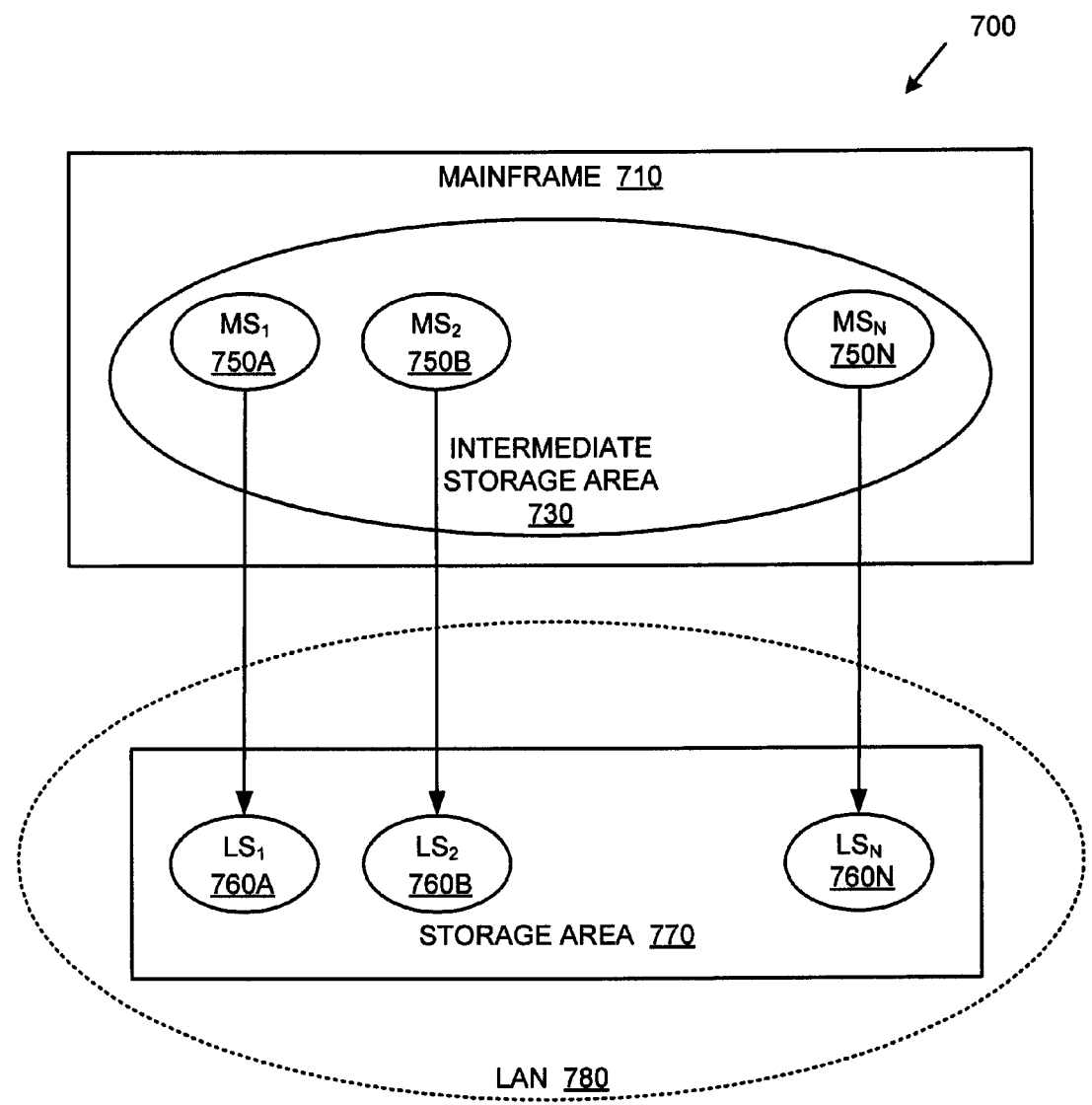
FIG. 7 is a block diagram of an exemplary system for downloading files from separate sub-areas into respective sub-areas on a LAN.

FIG. 7 is a block diagram of an exemplary system 700 for downloading files from separate sub-areas 750A-N in an intermediate storage area 730 on a mainframe 710 into respective sub-areas 760A-N of a storage area 770 on a LAN 780.

The sub-areas 750A-N can contain one or more files. In practice, one or more of the sub-areas 750A-N can be empty (e.g., have no files). The files can be stored in the sub-areas 750A-N according to a file type (e.g., a software element type associated with the file), project, or both. Thus, the files are logically separated by file type, project, or both into the different sub-areas 750A-N. The logical separation can be preserved when the files are downloaded to the LAN 780.

For purposes of illustration, the mainframe sub-areas 750A-N are labeled as mainframe sub-areas $MS_1$-$MS_n$. Likewise, the LAN sub-areas 760A-N are labeled as local sub-areas $LS_1$-$LS_n$. After downloading, the contents of $LS_x$ can mimic that of (e.g., have the same files as) $MS_x$ for each x.

EXAMPLE 8

Exemplary Method of Downloading Files from Separate Sub-Area

Figure 8:
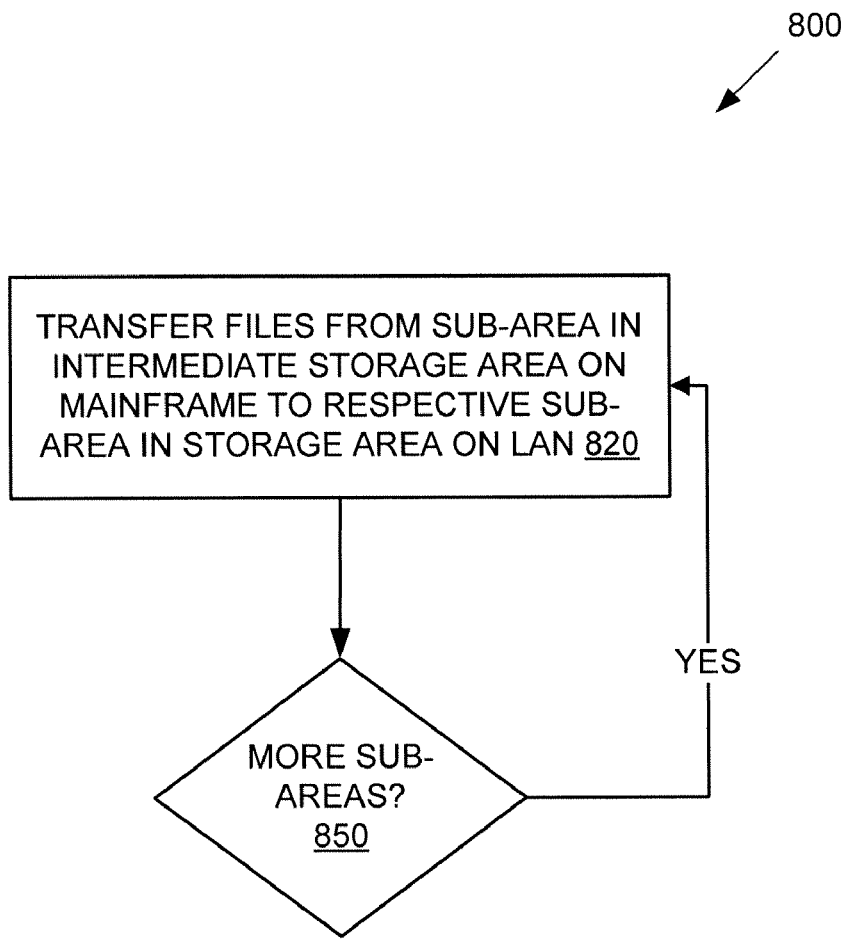
FIG. 8 is a flowchart of an exemplary method of downloading files from separate sub-areas into respective sub-areas on a LAN and can be carried out, for example, in an arrangement such as that shown in FIG. 7.

FIG. 8 is a flowchart of an exemplary method 800 of downloading files from separate sub-areas into respective sub-areas on a LAN and can be carried out, for example, in an arrangement such as that shown in FIG. 7.

In the example, at 820, one or more files are transferred from a sub-area in intermediate storage on a mainframe to a respective sub-area in a storage area on the LAN.

At 850, it is determined whether there are more sub-areas. If so, transfer is done for the next sub-area, and so forth (e.g., for each of the sub-areas or a selected subset of the sub-areas).

EXAMPLE 9

Exemplary Software Configuration Management Tool

In any of the examples herein, a software configuration management (SCM) tool on a mainframe can be any tool providing automated software configuration management. Such tools typically provide management features (e.g., version control) for the software elements such as source code, and other elements associated with software development.

In any of the examples herein, software development can include any of a variety of tasks taken on by software developers to design, write, revise, debug, test, maintain, or translate software.

A mainframe SCM tool typically includes a repository of software elements that include source code and other files related to a software development project. On a mainframe, software elements can include code elements such as source code, copybooks, control cards, bind cards, job control language files, and the like. Any of the examples herein can be applied to such software elements, or any other software elements managed by the SCM tool.

Examples of software configuration management tools on a mainframe include the ENDEVOR family of products from CA, Inc. (e.g., the ALLFUSION ENDEVOR CHANGE MANAGER software, and the like). However, the technologies described herein can be applied using any software configuration management tool managing mainframe software (e.g., an SCM tool from which software elements can be exported).

EXAMPLE 10

Exemplary Software Logic Analyzer

In any of the examples herein, a software logic analyzer can be any tool on a LAN for analyzing the logic of software for a mainframe. Such tools typically provide searching, analysis, and metrics for complexity of software elements such as source code, and other software elements associated with software development as described herein.

Examples of software logic analyzers include the SEEC family of products marketed by SEEC Technologies (e.g., SEEC MOSAIC Studio, and the like), the REVOLVE family of products marketed by Micro Focus, Ltd., and the like. However, any software logic analyzer (e.g., any software logic analyzer that can analyze mainframe software) can be used with the technologies described herein if desired.

In any of the examples herein, a software analyzer can distinguish files as different software elements via using separate sub-areas in which the files are stored.

EXAMPLE 11

Exemplary File Downloading Techniques

In any of the examples herein, file downloading can be achieved via any variety of technologies. Although the term "downloading" is used, file transfer is also sometimes called "uploading" depending on the perspective (e.g., uploading to the LAN from the mainframe). Downloading can be achieved by standard protocols such as the File Transfer Protocol (FTP), Kermit, and the like.

EXAMPLE 12

Exemplary File Downloading Via Separate Commands

In any of the examples herein, when downloading a plurality of files from a sub-area, instead of using a file transfer command to download the entire sub-area, a series of separate file download commands in the download protocol can be used (e.g., at least one separate command for a single file, even though there are a plurality of files present in the same sub-area).

In this way, the download can be achieved on a file-by-file basis. In such a case, the separate commands can request the files from a sub-area separately (e.g., by file name, after determining the names of the files present in the sub-area).

EXAMPLE 13

Exemplary Project

In any of the examples herein, software on a mainframe can be organized into one or more different projects by the software configuration management tool. Such a project can be called an "application," a "managed entity," or the like. In practice, the project can be referred to by a name (e.g., an alphanumeric identifier such as "BankingApp") so that a user can use the name to refer to the group of software elements associated with the project. The software configuration management tool can typically manage a plurality of projects, so having a name allows the user to differentiate among them.

Similarly, a software logic analyzer can also have named projects.

In addition to the software elements themselves, the project can contain any other information (e.g., older versions) for managing configuration of the software.

EXAMPLE 14

Exemplary Local Area Network

A local area network (LAN) can include any set of one or more computers that are networked with each other, an outside entity such as a server, (e.g., via a WAN), or both. Such a network can include wired and wireless networks of computing devices, such as microcomputers, electronic devices, and the like.

In the examples herein, a LAN comprises at least one computer with a local storage area onto which files can be downloaded. The front-end tool can be stored and run on the computer. However, the downloading can be done from the mainframe by one computer to another computer on the LAN.

EXAMPLE 15

Exemplary Mainframe

In any of the examples herein, a mainframe can be any large data processing system such as descendants of the IBM System/360 (e.g., System z9 mainframes), descendants of the Burroughs large systems, and descendants of the UNIVAC 1100/2200 series, and the like. Mainframes are typically able to support hundreds or even thousands of users simultaneously. The software shown as running on a mainframe can run under an appropriate operating system (e.g., the z/OS operating system of International Business Machines, Inc.).

In any of the examples herein, the software for implementing the mainframe side of the technology can be provided as a job control language (JCL) procedure, a compiled program, or the like.

EXAMPLE 16

Exemplary Intermediate Storage Area

In any of the examples herein, an intermediate storage area can be any location on a mainframe at which files are stored before they are downloaded from the mainframe to the LAN. In practice, such files are stored in computer-readable media accessible by the mainframe. The intermediate storage area can be divided into a plurality of sub-areas. In a mainframe environment, such sub-areas can be separate partitioned data sets (PDSs).

EXAMPLE 17

Exemplary Storage Area on LAN

In any of the examples herein, a storage area on a LAN can be any location to which files can be downloaded. In practice, the storage area takes the form of computer-readable media accessible by a computer on the LAN. For example, hard disks and the like can be used.

The storage area can be divided into a plurality of sub-areas. In a LAN environment, such sub-areas can be directories (e.g., sub-directories), folders (e.g., sub-folders), or the like.

EXAMPLE 18

Exemplary Files

In any of the examples herein, where the term "file" is used, the file can be or otherwise represent a software element (e.g., a software element saved as a file).

EXAMPLE 19

Exemplary System for Exporting Files from SCM Into Separate Sub-Areas

Figure 9:
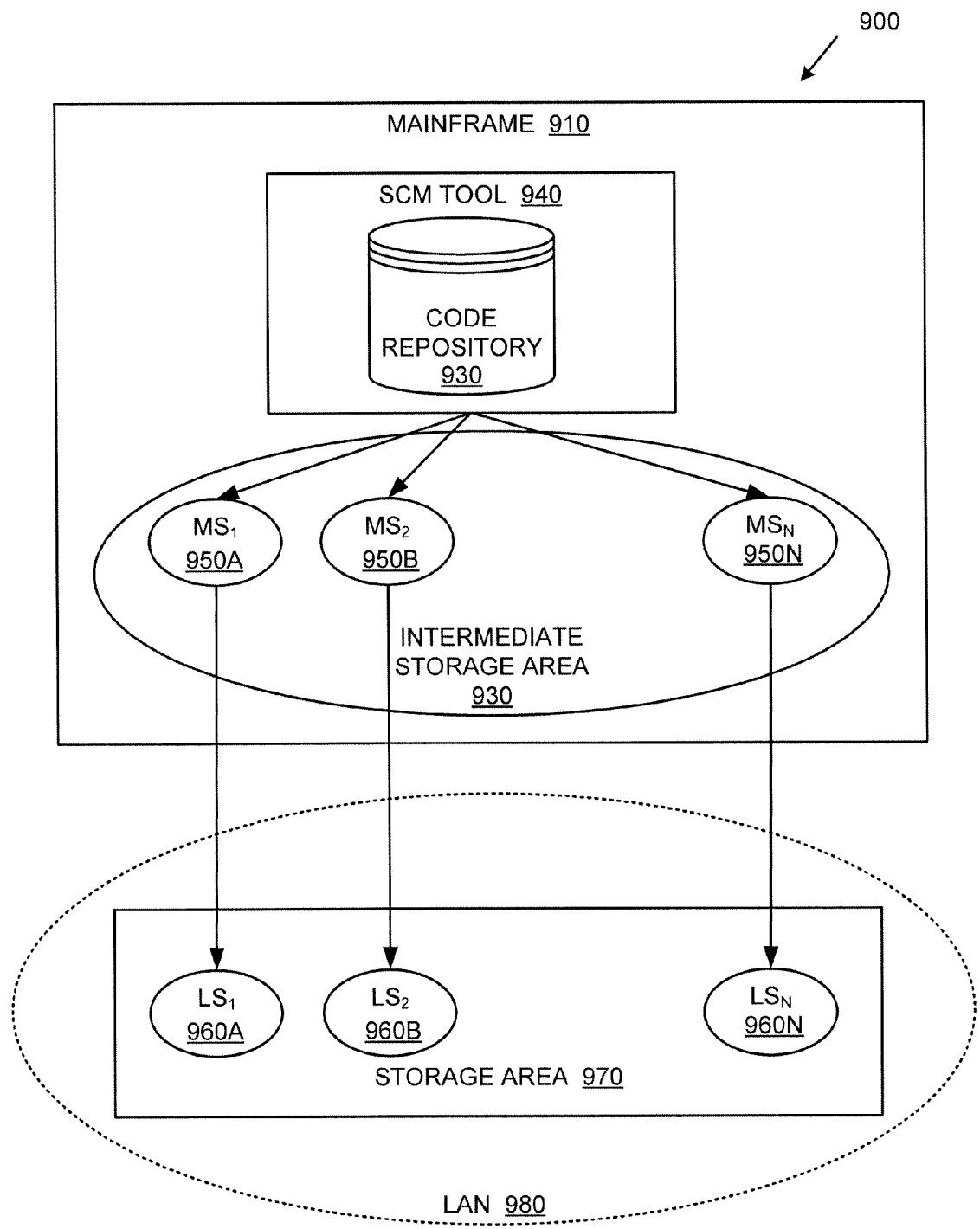
FIG. 9 is a block diagram of an exemplary system that includes a software configuration management (SCM) tool from which software elements can be exported into separate sub-areas according to type.

FIG. 9 is a block diagram of an exemplary system 900 that includes an SCM tool 940 for exporting software elements into separate sub-areas 950A-950N according to element type, project, or both. In the example, an SCM tool 940 on a mainframe 910 includes a code repository 930, from which software elements can be exported.

The software elements can be exported from the code repository 940 into separate sub-areas 950A-950N in an intermediate storage area 930 according to software element type, project, or both. So, for example, software elements (e.g., for one project) of one type can be exported to the sub-area 950A, software elements of a different type can be exported to the sub-area 950B, and so forth. Subsequently, the files can be downloaded into the local storage area 970 of the LAN 980 into respective sub-areas 960A-960N. An arrangement similar to that of FIG. 7 can be used.

EXAMPLE 20

Figure 10:
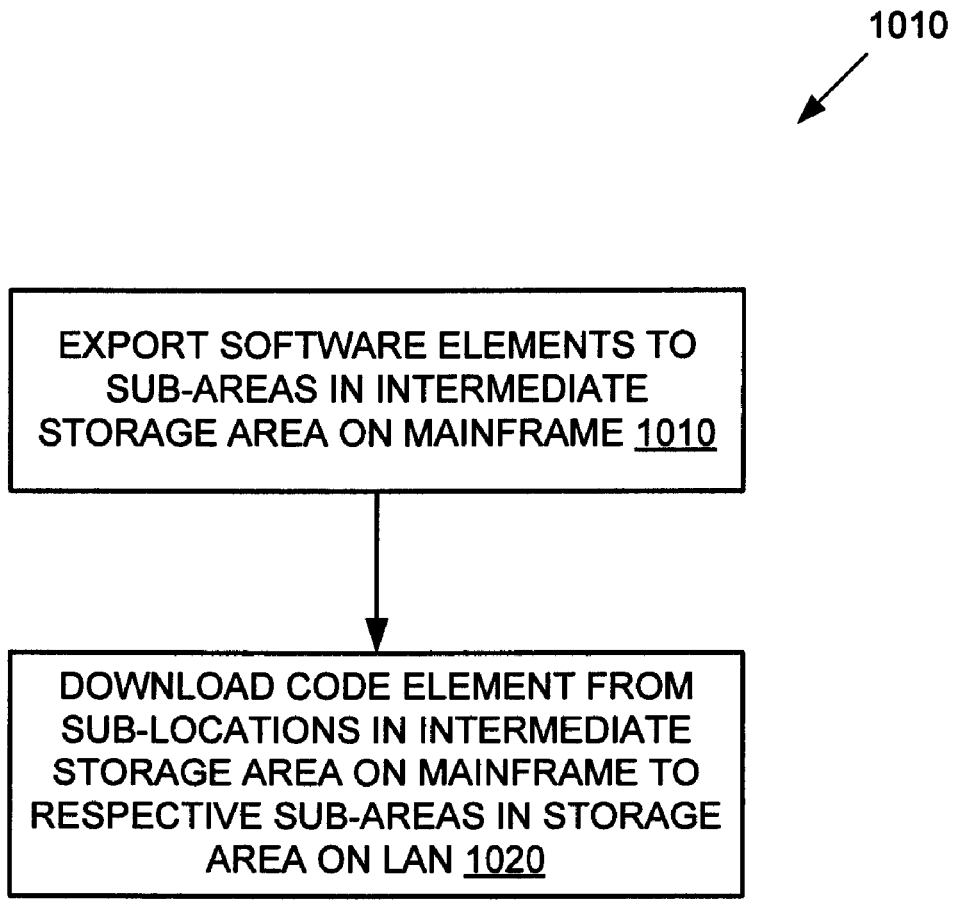
FIG. 10 is a flowchart of an exemplary method of exporting software elements into separate sub-areas according to element type.

Exemplary Method for Exporting Software Elements from SCM Tool Into Separate Sub-Areas FIG. 10 is a flowchart of an exemplary method 1000 of exporting software elements into separate sub-areas according to software element type, project, or both. In the example, at 1010, software elements are extracted from an SCM tool to respective sub-areas in an intermediate storage area of a mainframe (e.g., as shown in FIG. 9). Export can be achieved from the SCM tool, a back-end tool, or both working in concert. Export can be performed responsive to a command received at the mainframe.

At 1020, the files are downloaded from sub-locations in the intermediate storage area on the mainframe to respective sub-areas in a storage area in the LAN. Download can be achieved via a front-end tool or manually. Download can be performed responsive to a user interface action received in the local area network (e.g., via any of the user interfaces for a front-end tool described herein).

EXAMPLE 21

Exemplary Advantages for Placing Files in Separate Sub-Areas According to Element Type of File Some of the examples show separating the files into separate sub-areas according to a software element type associated with a file, a project associated with a file, or both. A possible advantage of such an arrangement is achieved when a software logic analyzer is to be employed. Such an analyzer may require that the software elements be placed in separate areas (e.g., and for different projects) before it will import them into its analysis system.

In such a scenario, the process of placing the elements in the separate areas can be automated as described herein, greatly reducing the amount of time and effort required and increasing accuracy as compared to a manual process.

EXAMPLE 22

Exemplary Parameter-Driven Exporting

Figure 11:
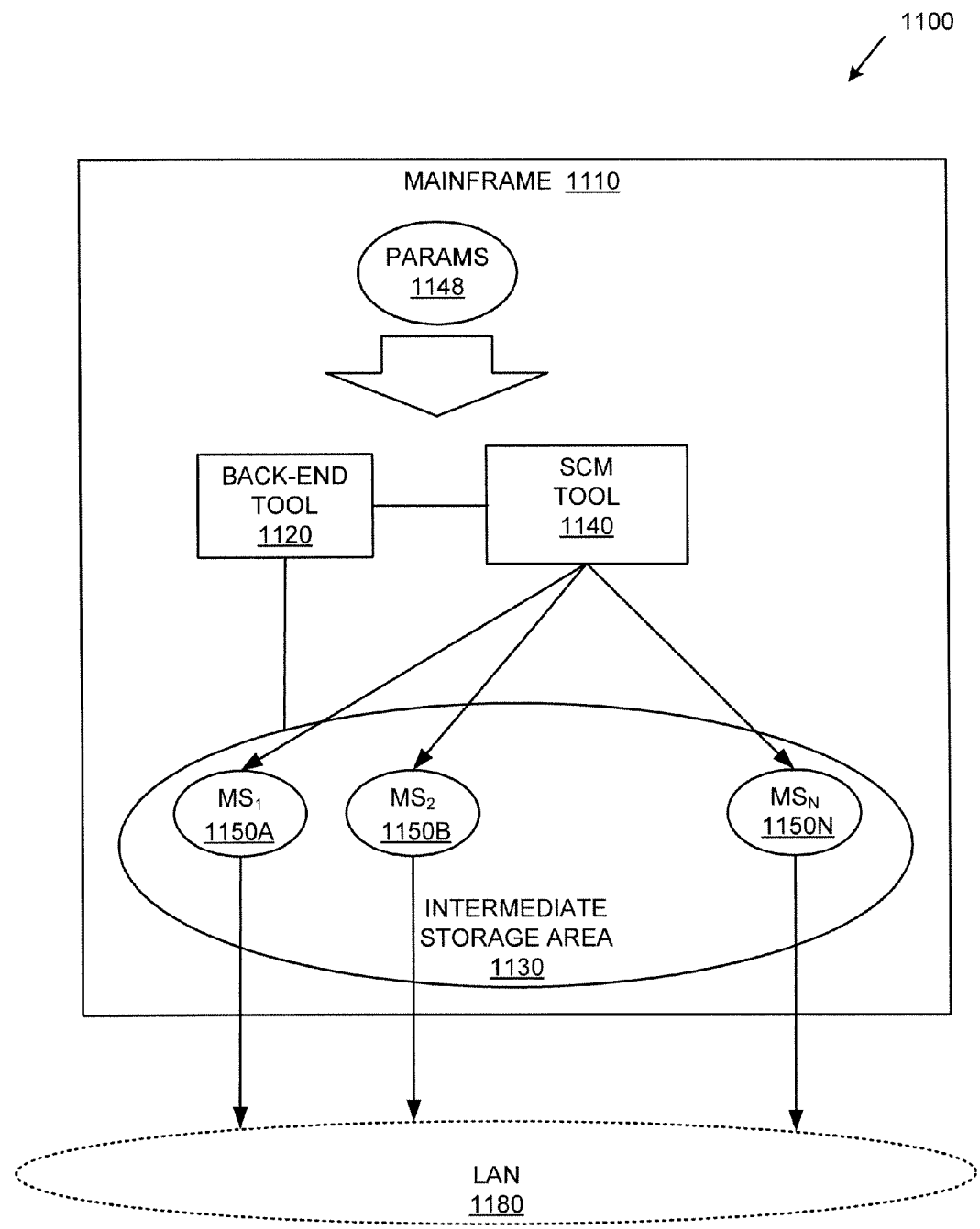
FIG. 11 is a block diagram of a system including a back-end tool that accomplishes file export from a software configuration management tool via parameters.

FIG. 11 is a block diagram of a system 1100 including a back-end tool 1120 that accomplishes file export from a software configuration management tool 1140 via export parameters 1148. The parameters can be provided to the back-end tool 1120, the SCM tool 1140, or both.

In the example, software elements can be exported from the SCM tool 1140 on the mainframe 1110 via the export parameters 1148 to files in sub-areas 1150A-N within the intermediate storage area 1130. The files can then be downloaded to the LAN 1180.

EXAMPLE 23

Exemplary Parameter-Driven Export Method

Figure 12:
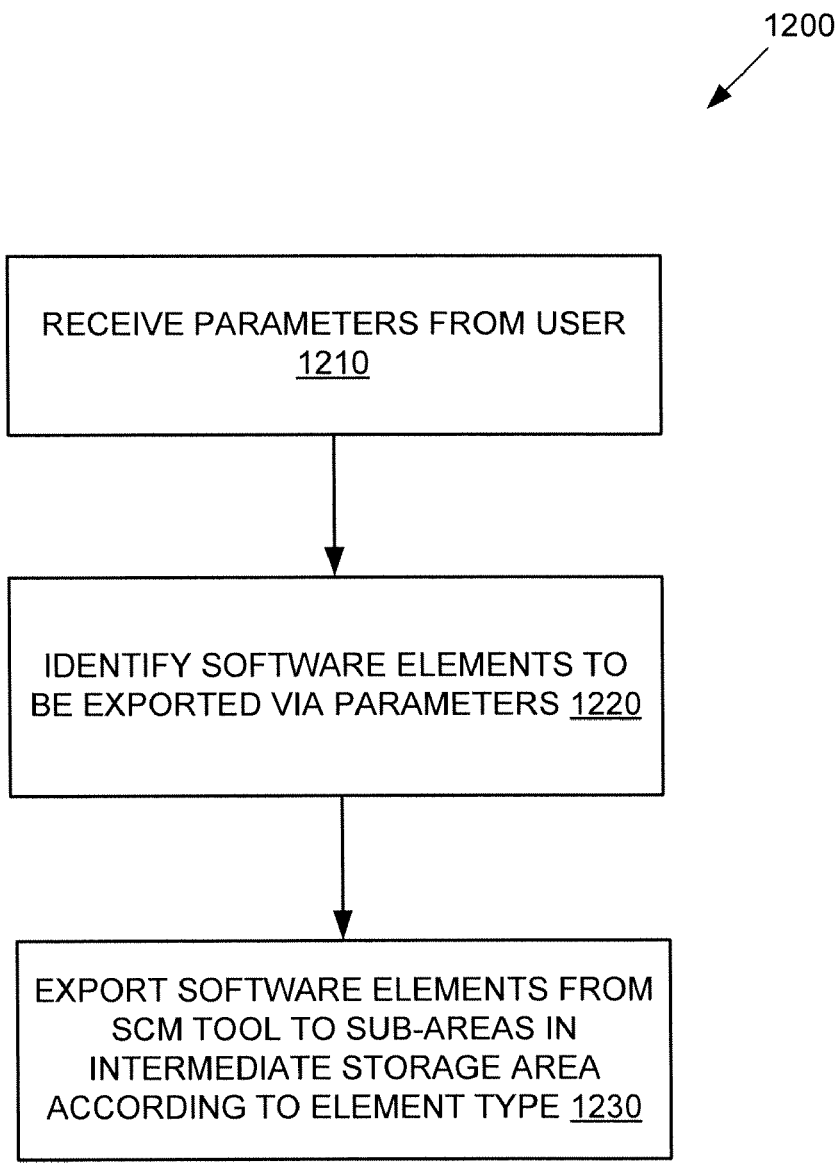
FIG. 12 is a flowchart of an exemplary method of exporting files based on parameters received from a user.

FIG. 12 is a flowchart of an exemplary method 1200 of exporting files from a software configuration management tool. In the example, at 1210, one or more export parameters are received from a user. Using the export parameters, the software elements to be exported are identified at 1220.

At 1230, the identified software elements are exported from the SCM tool to sub-areas in an intermediate storage area of the mainframe according to element type, project, or both.

In any of the examples herein, processing on the mainframe side (e.g., the method 1200) can be accomplished with minimal effort on the part of a user. For example, the user can simply submit a job on the mainframe, and input the parameters. The rest of the processing can be automatic (e.g., performed by the mainframe without user interaction). Sub-areas can be created automatically or manually.

EXAMPLE 24

Exemplary Export Parameters

In any of the examples herein, one or more export parameters can be used to guide an export process. For example, the export parameters can indicate the name of one or more projects from which the software elements are to be exported. Other parameters, such as a high-level qualifier or the like (e.g., for sub-area creation), can be included.

Criteria can also be specified via the export parameters. For example, a parameter can specify that only software elements that have changed in a certain time period are to be exported (e.g., those software elements that have been modified in the last n days).

When identifying the software elements to be exported, the parameters can be applied appropriately (e.g., limiting the elements to those of the specified projects, element types, those falling within the criteria, and the like).

The export parameters can also be used to specify the intermediate storage location. For example, an intermediate storage location can be created having a name as specified by one or more of the export parameters.

EXAMPLE 25

Exemplary Back-End Tool

Figure 13:
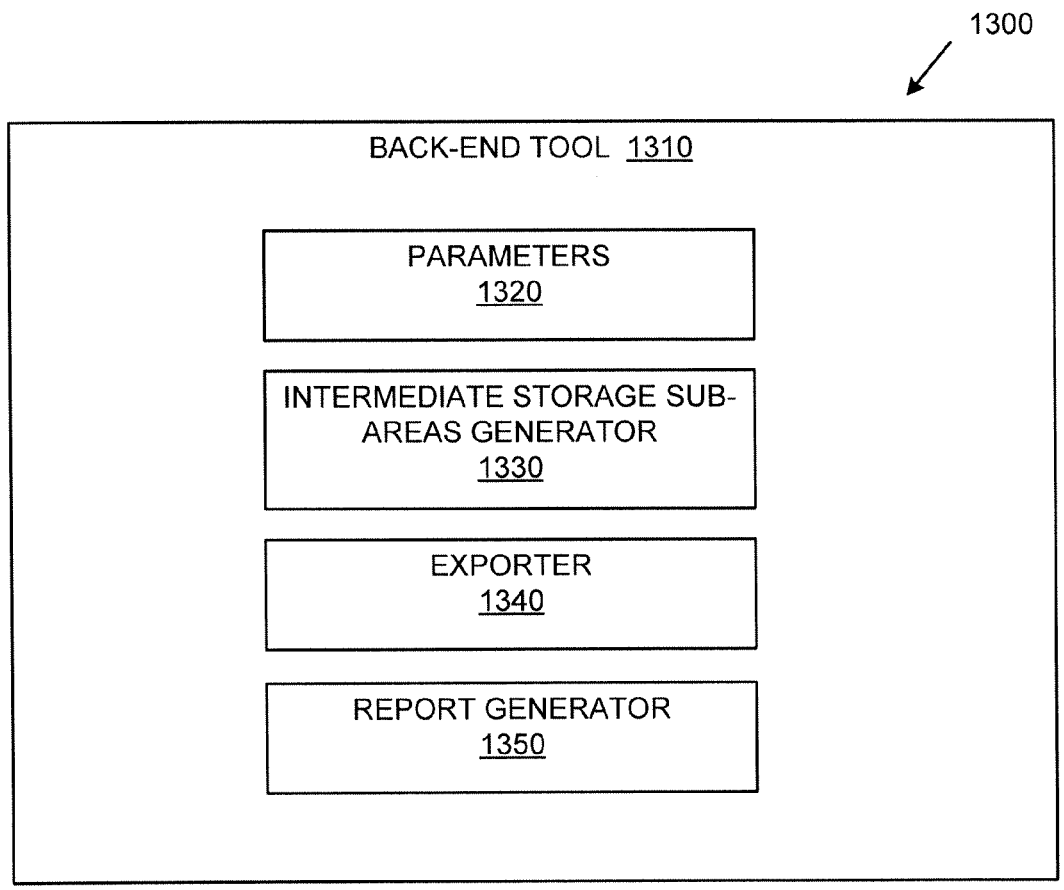
FIG. 13 is a block diagram of an exemplary back-end tool.

FIG. 13 is a block diagram 1300 of an exemplary back-end tool 1310. In the example, the back-end tool 1310 includes stored export parameters 1320, an intermediate storage sub-area generator 1330, an exporter 1340, and a report generator 1350.

The stored export parameters 1320 can store the export parameters provided to the back-end tool.

The intermediate storage sub-areas generator 1330 can create sub-areas, such as partitioned data sets to store the exported software elements.

The exporter 1340 can coordinate exportation of the software elements from the SCM tool.

The report generator 1350 can generate an audit report indicating which files were exported. Such a report can be helpful for a user to determine whether the export process proceeded as expected and comparing with elements finally loaded on the LAN.

EXAMPLE 26

Exemplary Method of Back-End Tool

Figure 14:
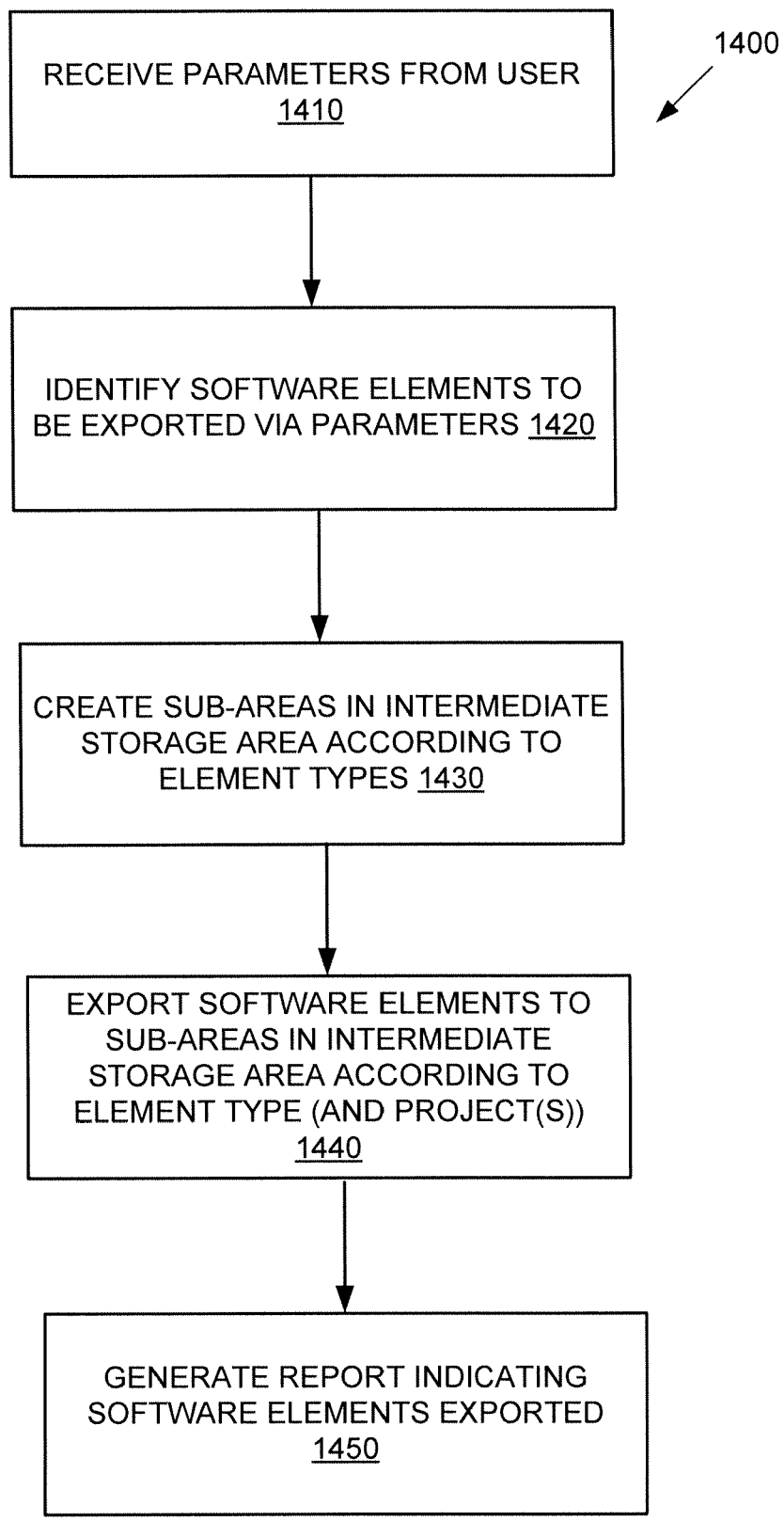
FIG. 14 is a flowchart of an exemplary method performed by a back-end tool to export software elements for download.

FIG. 14 is a flowchart of an exemplary method 1400 performed by a back-end tool to export software elements for download. In the example, at 1410, export parameters are received from a user. At 1420, the software elements to be exported from the SCM tool are identified via the export parameters.

At 1430, sub-areas in the intermediate storage area on the mainframe are created according to the element types (e.g., and projects) of the software elements to be exported. So, for example, if there are t different types of elements, t sub-areas are created. In a multi-project scenario, if there are z projects, t×z sub-areas are created. In some cases, a sub-area may already exist. It can be emptied or otherwise erased instead of re-creating the sub-area.

At 1440, the software elements are exported to the sub-areas as files according to the element type, project, or both. For example, as shown in some of the examples herein, the files can be separated into the sub-areas according to the element type, project, or both associated with the file.

At 1450, a report can be generated indicating which software elements were exported.

EXAMPLE 27

Exemplary User Interface of Back-End Tool

On the mainframe side, a user can provide input parameters and execute a job in batch mode. FIG. 15 is a screen shot of an exemplary user interface 1510 used to input parameters by a back-end tool. In the example, a user enters a project name, a high level qualifier, and a number of days, n. Responsive to receiving the parameters, the software elements of the project name that have been modified in the last n days are exported. The project can specify a logical area within the mainframe where the project can be found. The high level qualifier can indicate location of the intermediate storage area (e.g., and thus the sub-areas).

EXAMPLE 28

Exemplary Front-End Tool

Figure 16:
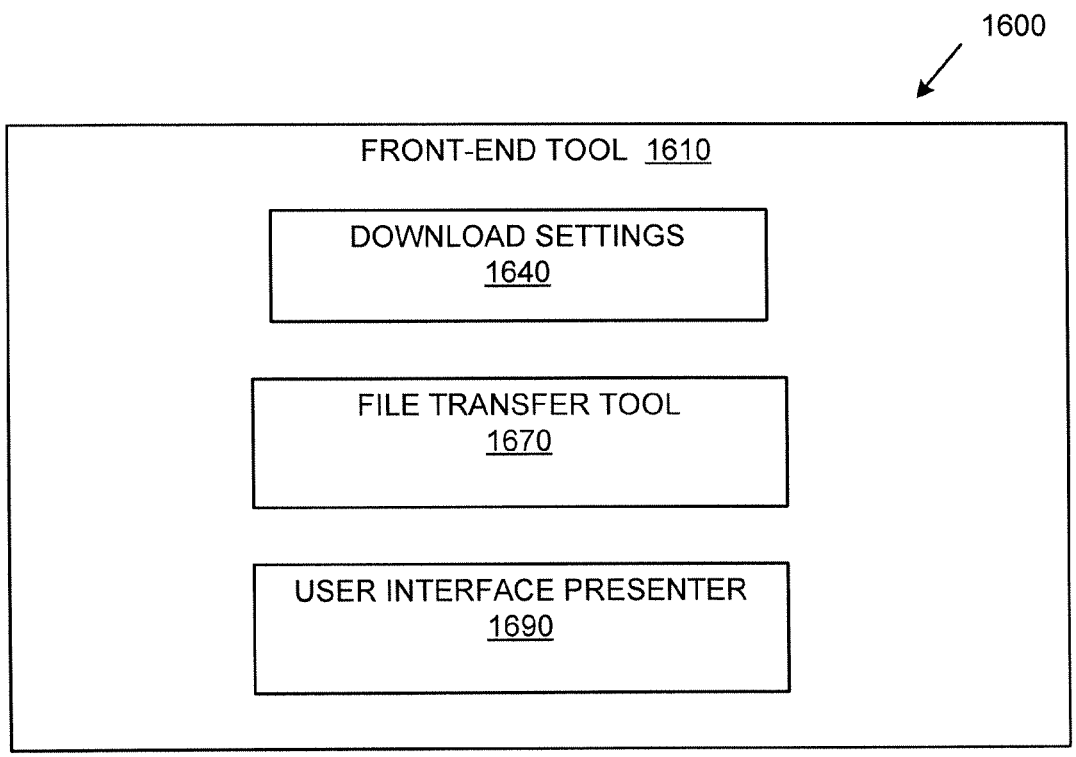
FIG. 16 is a block diagram of an exemplary front-end tool.

FIG. 16 is a block diagram 1600 of an exemplary front-end tool 1610. In the example, the front-end tool 1610 includes stored download settings 1640, a file transfer tool 1670, and a user interface presenter 1690. The stored download settings

1640 can store download settings, which can be automatically loaded when the tool is started, entered by a user, or retrieved via a name.

The file transfer tool 1670 can take appropriate action to download files from the mainframe to the LAN as specified in the stored download settings 1640.

The user interface presenter 1690 can display one or more of the stored download settings 1640 and allow a user to edit them or retrieve via a name.

EXAMPLE 29

Exemplary Method of Front-End Tool

Figure 17:
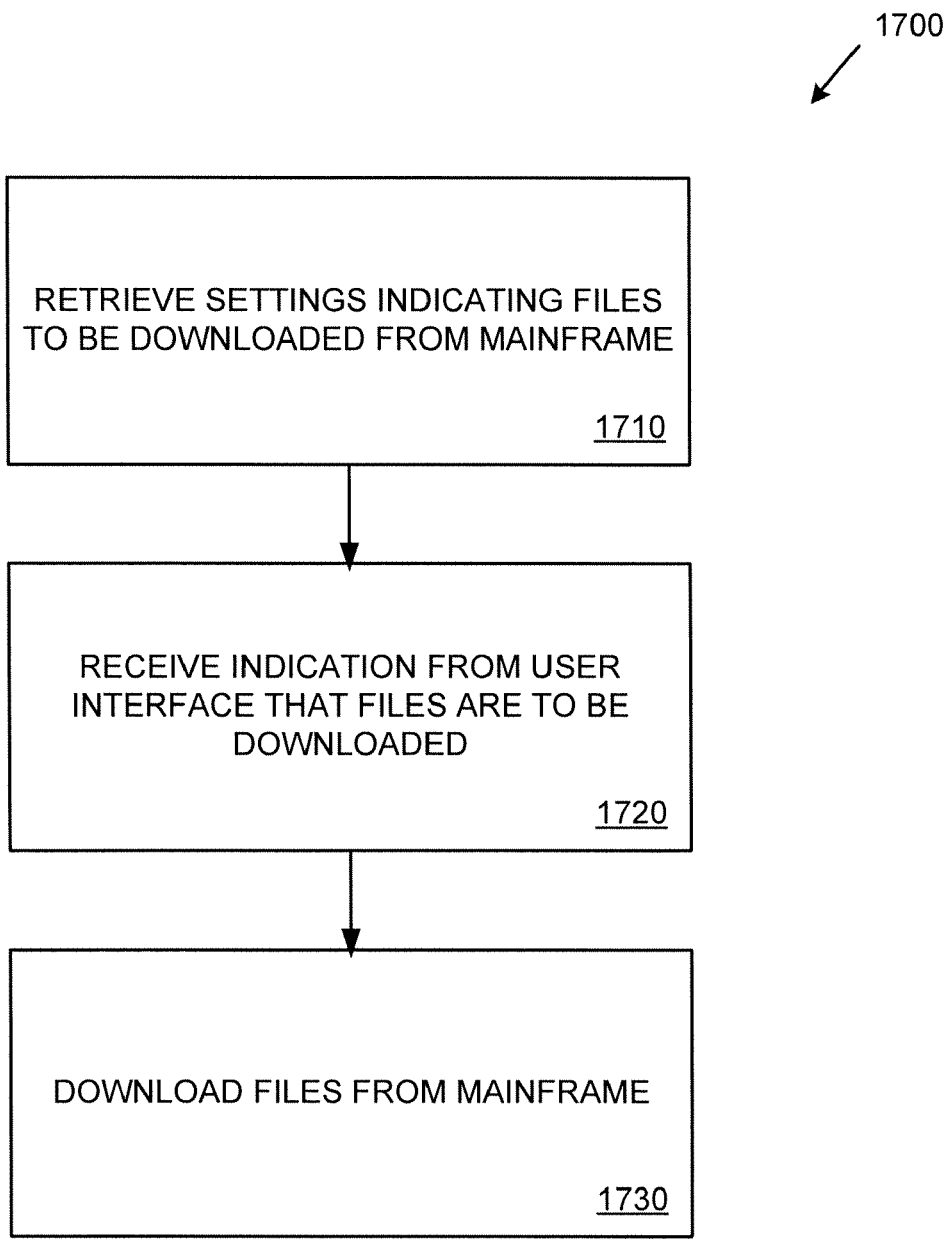
FIG. 17 is a flowchart of an exemplary method performed by the front-end tool to download files from a mainframe.

FIG. 17 is a flowchart of an exemplary method 1700 performed by a front-end tool to download files from a mainframe. The method 1700 can be augmented by adding any of the techniques described herein. In the example, at 1710, download settings indicating files to be downloaded from a mainframe are retrieved. For example, responsive to receiving a name of saved download settings, the saved download settings can be retrieved (e.g., via the name).

At 1720, an indication is received via a user interface (e.g., of the front-end tool) that the files are to be downloaded. At 1730, responsive to receiving the indication, the files are downloaded from the mainframe via the download settings. If download was unsuccessful, the download process can be restarted.

EXAMPLE 30

Exemplary Download Settings

In any of the examples herein, download settings can include information indicating files to be downloaded from a mainframe. The files can be indicated, for example, by specifying a location of an intermediate storage area on a mainframe.

Download settings can also include information indicating to where the files are to be downloaded on a LAN (e.g., a location of a storage area on the LAN). Download settings can also include information indicating which files (e.g., which element types) are to be downloaded.

EXAMPLE 31

Exemplary User Interface of Front-End Tool

Figure 18:
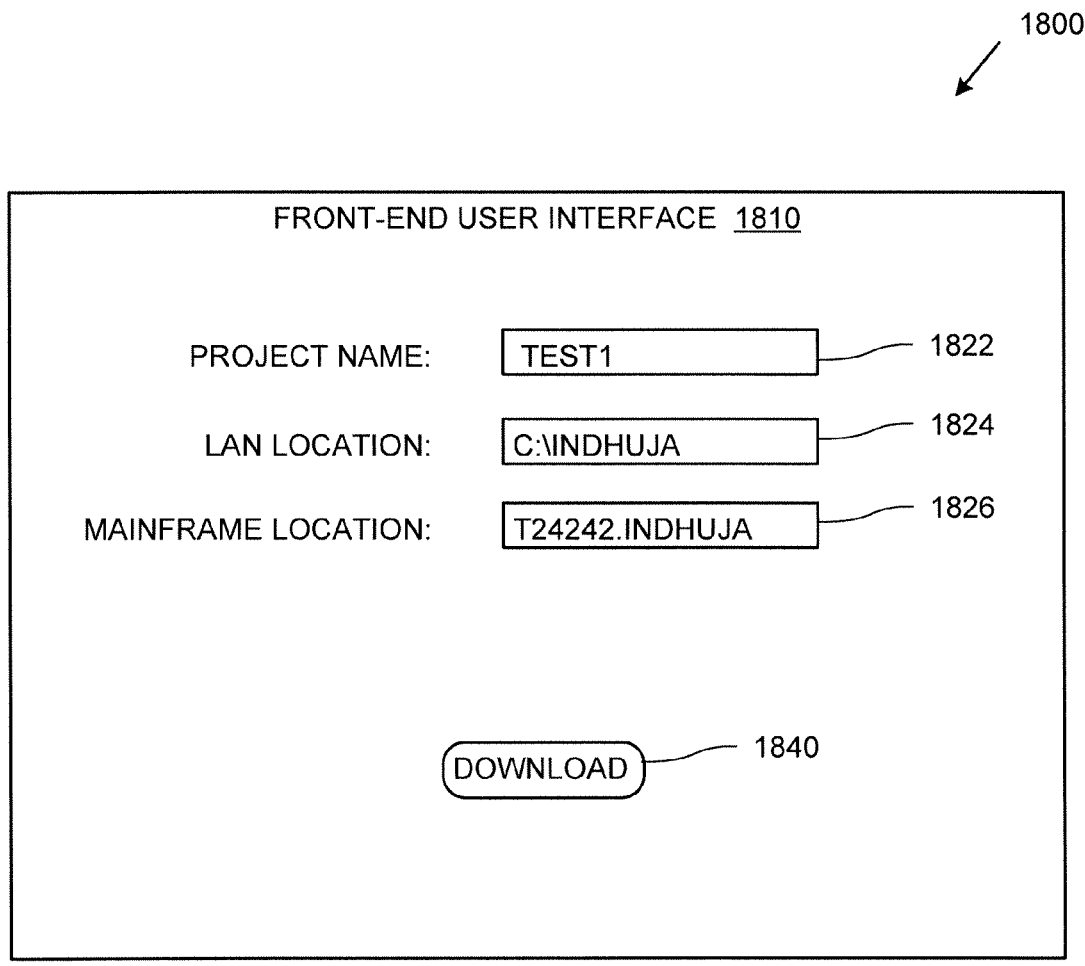
FIG. 18 is a screen shot of an exemplary user interface presented by a front-end tool, such as that shown in FIG. 16.

FIG. 18 is a screen shot 1800 of an exemplary user interface 1810 presented by a front-end tool. In the example, the user interface 1810 presents a project name 1822. The project name can be edited via the user interface 1810. If desired, a drop-down list or other mechanism can be used to present a list of projects names (e.g., for which download settings are stored).

The LAN location 1824 can also be edited. The LAN location 1824 can be stored as part of the download settings associated with a name (e.g., the project name). The LAN location 1824 can specify the storage area on the LAN to which files are downloaded.

The mainframe location 1826 can also be edited. The mainframe location 1826 can be stored as part of the download settings associated with a name (e.g., the project name). The mainframe location 1826 can partially specify the intermediate storage area from which files are downloaded. For example, it can serve as a high level qualifier. For example, a naming convention for partitioned data sets can specify that the names for sub-areas on the mainframe are to be constructed as follows:

<<high-level qualifier>>.<<project name>>.<<element type>>

The graphical download button 1840 can be activated by a user (e.g., by clicking on the graphical button 1840 with a graphical pointer) to initiate the download process according to the download settings.

In practice, additional download settings or options can be presented by the user interface 1810.

EXAMPLE 32

Exemplary Method When Interacting with Front-End User Interface

Figure 19:
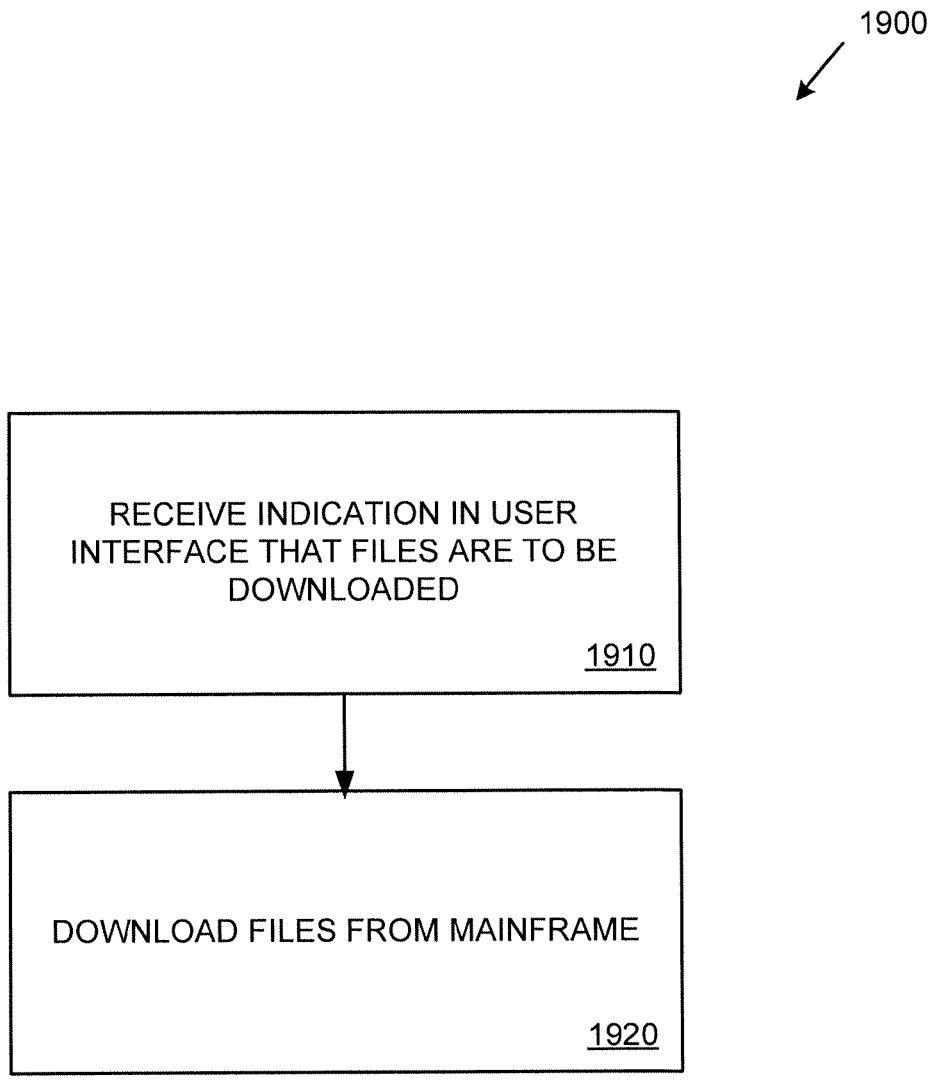
FIG. 19 is a flowchart of an exemplary method performed when interacting with a user interface presented by a front-end tool, such as the user interface shown in FIG. 18.

FIG. 19 is a flowchart of an exemplary method 1900 performed when interacting with a user interface presented by a front-end tool, such as the user interface shown in FIG. 18. In the example, at 1910, an indication is received in the user interface that files are to be downloaded. At 1920, responsive to receiving the indication, the files are downloaded from the mainframe.

Stored download settings can indicate how to proceed with the download process. For example, a naming convention for partitioned data sets can specify that the names for sub-areas on the mainframe are to be constructed as follows:

<<high-level qualifier>>.<<project name>>.<<element type>>

EXAMPLE 33

Exemplary Method with Settings When Interacting with Front-End User Interface

Figure 20:
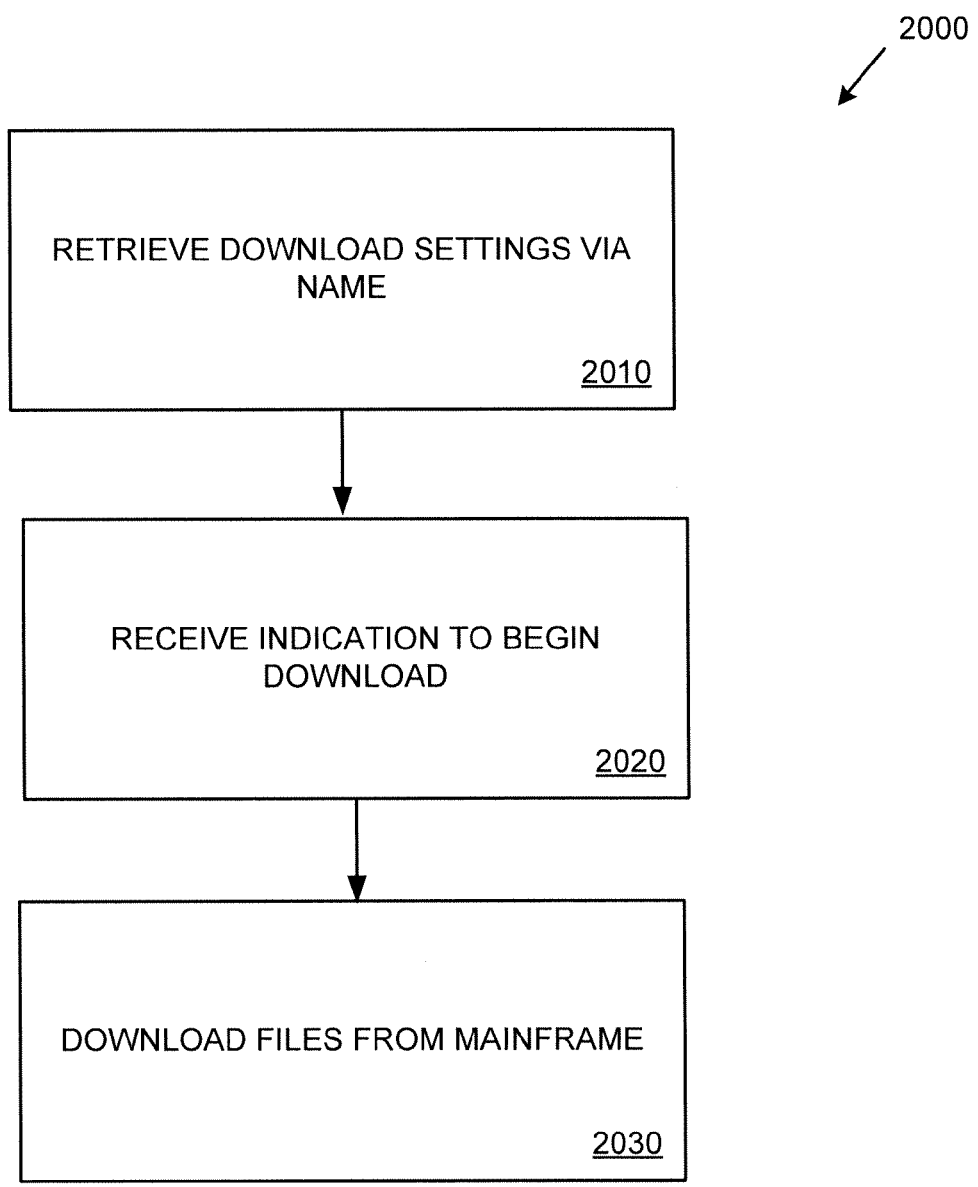
FIG. 20 is a flowchart of an exemplary method involving settings performed when interacting with a user interface presented by a front-end tool, such as the user interface shown in FIG. 18.

FIG. 20 is a flowchart of an exemplary method 2000 involving settings performed when interacting with a user interface presented by a front-end tool, such as the user interface shown in FIG. 18. In the example, at 2010, download settings are retrieved via a name. Such settings can be retrieved automatically when the tool is started (e.g., using the most-recent name specified before the tool was started) or in response to a user selection of a name. The name used to retrieve the download settings can be displayed by the user interface.

At 2020, an indication to begin the download is received. For example, a user can activate a graphical "Download" button.

At 2030, files are downloaded from a mainframe according to the download settings. Download can proceed as described in any of the examples herein, such as by downloading to respective separate sub-areas.

EXAMPLE 34

Exemplary Plural Project Settings

In any of the examples herein, a feature can be provided by which a plurality of settings can be applied responsive to a single action in the user interface. So, for example, when downloading, instead of simply applying download settings for a single project, download settings for plural projects can be selected via the user interface.

An example of such an implementation allows the user to select first download settings (e.g., for a first project, via a project name) via the user interface. The user can then indicate second and subsequent download settings (e.g., via respective names of the project) via a graphical More button or by being asked by the user interface if more settings are desired.

Thus, a list of a plurality of sets of download settings can be assembled. When the download is initiated (e.g., via a graphical Download button), downloading can proceed for the projects (e.g., all projects) in the download settings list.

Thus, further responsive to a user interface action received in a local area network, the software elements can be downloaded from a second plurality of sub-areas (e.g., in a second or the same intermediate storage area) of the mainframe to second respective sub-areas (e.g., in a second or the same storage area) in the local area network (e.g., in accordance with the second set of download settings), and so forth for additional projects, if any.

EXAMPLE 35

Exemplary User Interface of Front-End Tool

Figure 21:
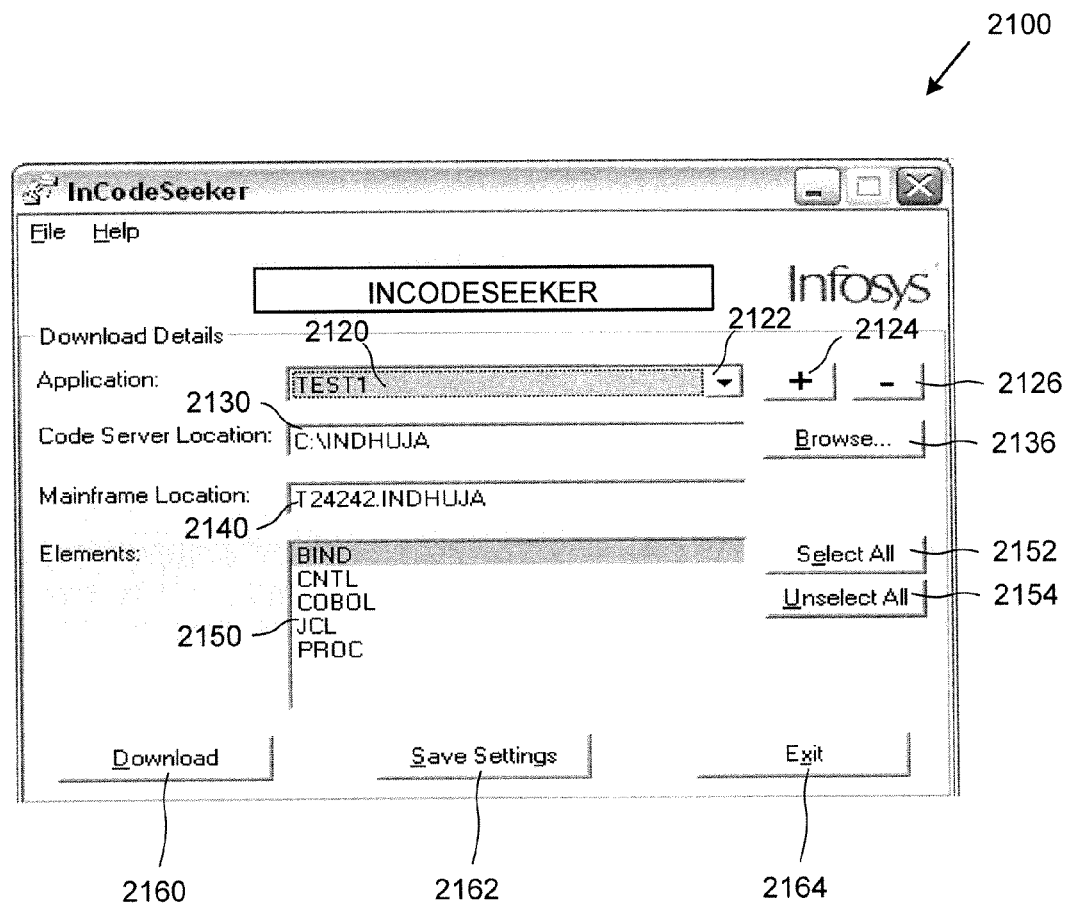
FIG. 21 is a screen shot of an exemplary user interface presented by a front-end tool, such as that shown in FIG. 16.

FIG. 21 is a screen shot of an exemplary user interface 2100 presented by a front-end tool. Any combination of one or more of the features shown can be used in any of the examples herein.

In the example, settings can be retrieved by a name 2120, shown as the project name 2120 after the "Application:" heading. Settings that have been saved for other names can be retrieved via a drop down menu which is activated by the drop down box 2122.

New settings (e.g., for a new project) can be created by using the graphical add button 2124, and the present settings can be deleted via the graphical delete button 2126.

The storage area on the LAN to which the files are to be downloaded is specified via the location 2130 after the "Code Server Location:" heading. A location on the LAN can be entered manually by typing or by using the graphical Browse button 2136.

The intermediate storage area on the mainframe from which the files are to be downloaded is specified partially via the location 2140 after the "Mainframe Location:" heading. A location can be entered manually by typing. The location can be used as a high-level qualifier to partially specify the intermediate storage location on the mainframe. For example, a naming convention for partitioned data sets can specify that the names for sub-areas on the mainframe are to be constructed as follows:

<<high-level qualifier>>.<<project name>>.<<element type>>

The user interface 2100 also provides a mechanism by which the sub-areas to be downloaded can be specified on a sub-area by sub-area basis. The list box 2150 presents a list of the sub-areas after the "Elements:" heading. One or more of the listed sub-areas can be selected by a user (e.g., using click, shift-click, control-click, and the like) to specify which of the sub-areas (e.g., and thus the elements stored therein as files) are to be downloaded. All sub-areas can be selected using the graphical Select All button 2152, or all unselected using the graphical Unselect All button 2154.

In a scenario involving software elements that are stored in different respective sub-areas, the list of sub-areas can be a list of a plurality of software element type names. After accepting a user selection of one or more of the software element type names, downloading will be limited to software elements of respective of the one or more software element type names selected. Additionally, a user selection of one or more projects can be accepted. If so, downloading is limited to the software projects selected.

The graphical Download button 2160 can be used to initiate download.

The graphical Save Settings button 2162 can be used to save the presently displayed settings with the name shown in the name box 2120. The settings can be later retrieved via the name.

The graphical Exit button 2164 can be used to exit the front-end tool.

EXAMPLE 36

Exemplary Custom Sub-Areas

In any of the examples herein, the sub-areas, projects, or both from which files are downloaded can be custom specified by a user. For example, a developer may wish to put a group of elements or other items as files in a partitioned data set having a name other than that specified for an element name (e.g., a personal storage area). Such a name can be used with the technologies described herein.

EXAMPLE 37

Exemplary User Interface of Front-End Tool

Figure 22:
FIG. 22 is a screen shot of an exemplary user interface presented by a front-end tool, such as that shown in FIG. 16, to show that download has been completed.

FIG. 22 is a screen shot of an exemplary user interface 2200 presented by a front-end tool to show the progress and let the user know that download has been completed. If desired, a window or other user interface can be displayed to provide an indication of which files are being downloaded. Such a user interface can be helpful for a user to know the progress of download and determine whether the download process proceeded as expected.

The example shows an interface 2200 that includes a display of the current directory (e.g., listed one-by-one as the tool proceeds through the directories) and then the files that are downloaded for the current directory.

A separate indication that the download is complete can also be displayed.

EXAMPLE 38

Exemplary Audit Report

A report can be generated on the mainframe side to indicate which files were exported. An example of such a report is shown in Table 1.

TABLE 1

Report from Mainframe Side

| PDS Name | ELEMENT COUNT |
|---|---|
| "M145.MPJ1002.MPROD.ERISCO.ASMBAT" | 000000006 |
| "M145.MPJ1002.MPROD.ERISCO.BMSCOPY" | 000000162 |
| "M145.MPJ1002.MPROD.ERISCO.BMSMAP" | 000000162 |
| "M145.MPJ1002.MPROD.ERISCO.COPYRCD" | 000001087 |
| . . . | . . . |

The report can simply specify the number of elements that were or are going to be extracted (e.g., for approval by the user). Although the report is initially stored on the mainframe, it can be retrieved to the LAN for viewing (e.g., to determine whether the export process proceeded or will proceed as expected).

A report on the LAN side can appear such as that shown in the user interface 2200 of FIG. 22. On the LAN side, the report can instead simply specify the number of elements that were extracted.

The two reports can be compared to determine whether everything that was exported from the SCM Tool to the intermediate storage has been downloaded to the LAN.

EXAMPLE 39

Exemplary Bundling of the Technology

The technologies described herein can be provided in the form of any of the back-end tools described herein and any of the front-end tools described herein. Typically, the software configuration management tool and software logic analyzer need not be included (e.g., they can be obtained from third parties). However, it is possible to bundle the technology otherwise (e.g., as part of the software logic analyzer or a software configuration management tool).

EXAMPLE 40

Exemplary Downloading Format

If desired, the format for downloading the files can be set automatically. So, for example, it may be desirable to download the files as "text" format rather than "binary" format. If so, the files can be downloaded according to the desired format without input from a user.

EXAMPLE 41

Exemplary Cooperation between Tools on Mainframe Side

Figure 23:
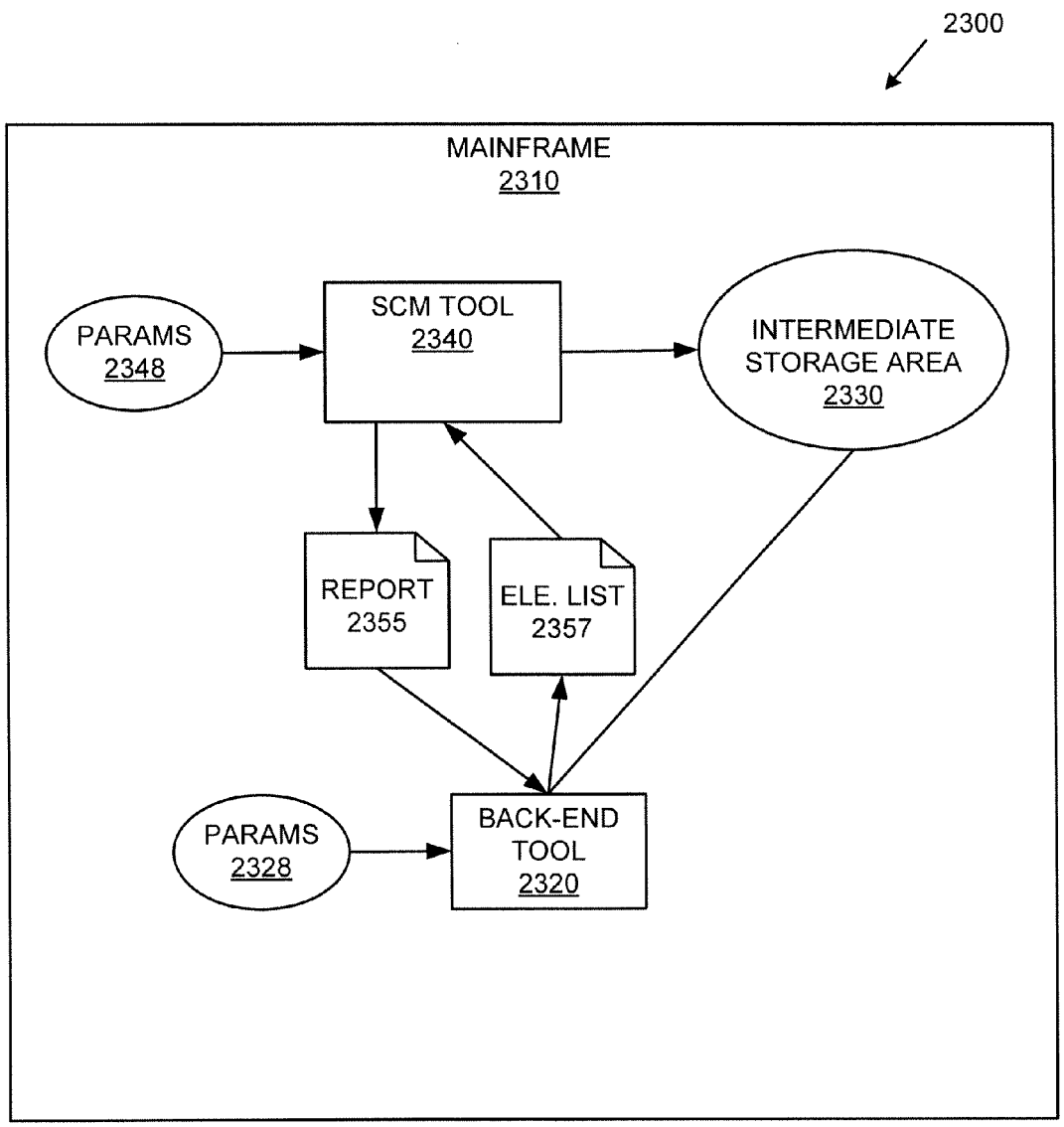
FIG. 23 is a block diagram showing a system in which an SCM tool and a back-end tool cooperate on the mainframe side to place files in an intermediate storage area.

FIG. 23 is a block diagram showing a system 2300 in which an SCM tool 2340 and a back-end tool 2320 cooperate on the mainframe 2310 to place files in an intermediate storage area 2330. In the example, export parameters 2348 can be accepted by an SCM tool 2340, which produces a report 2355. The back-end tool 2320 can also accept export parameters 2328. Via the report 2355, the back-end tool 2320 can generate an SCM-tool-compatible software element list 2357, listing the software elements desired to be exported (as determined by analyzing the report 2355 and the export parameters 2328). The SCM Tool 2340 can then process the software element list 2357 and place the appropriate software elements in appropriate sub-areas in the intermediate storage area 2330.

The back-end tool 2320 can administer the intermediate storage area 2330 (e.g., by creating or erasing sub-areas, such as partitioned data stores for the respective software elements to be exported from the SCM tool 2340).

EXAMPLE 42

Exemplary Method of Cooperation between Tools on Mainframe Side

Figure 24:
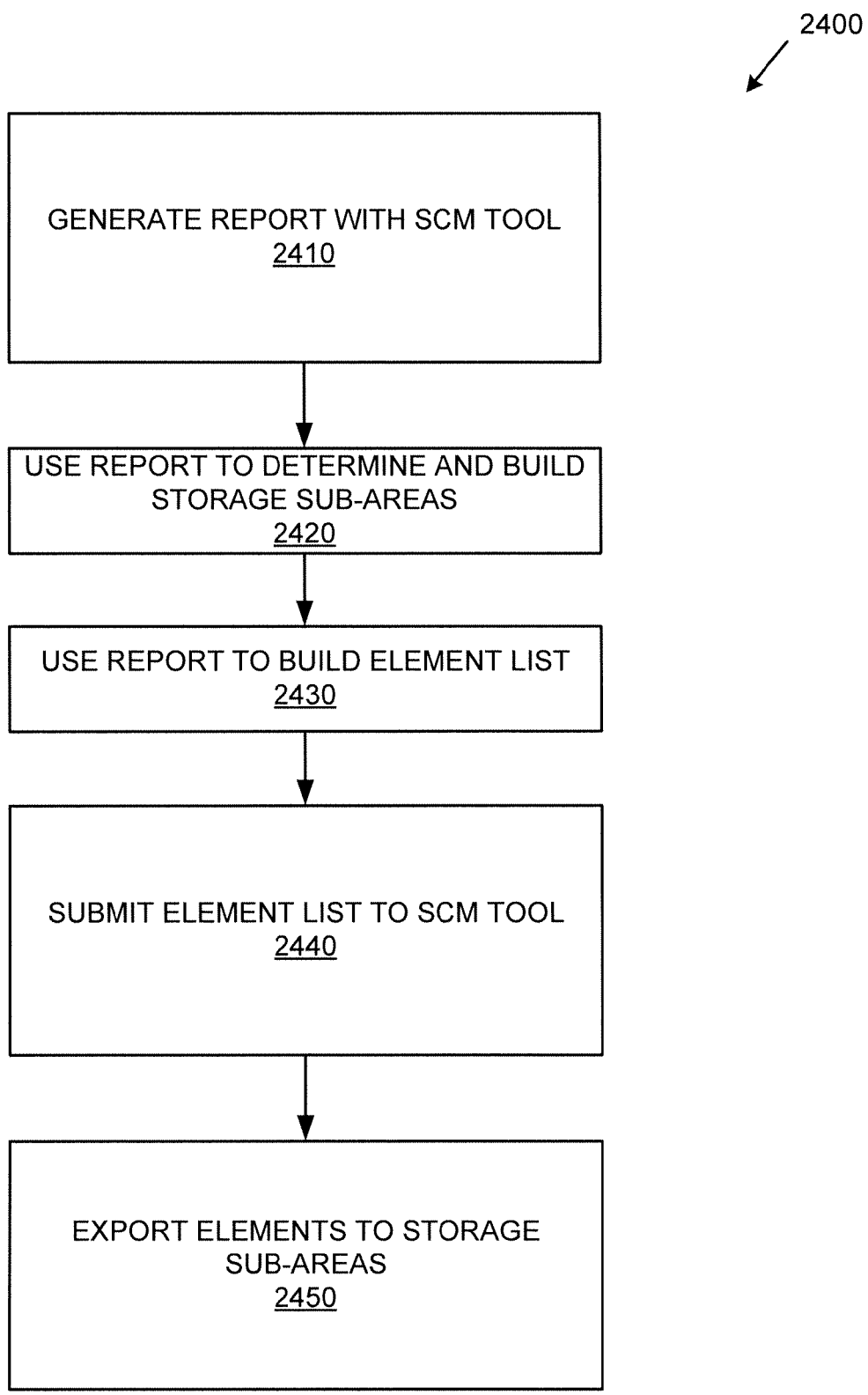
FIG. 24 is a flowchart of an exemplary method in which an SCM tool and a back-end tool cooperate on the mainframe side to place files in an intermediate storage area via an arrangement such as that shown in FIG. 23.

FIG. 24 is a flowchart showing an exemplary method 2400 in which an SCM tool and a back-end tool cooperate on the mainframe side to place files in an intermediate storage area via an arrangement such as that shown in FIG. 23. In the example, at 2410, a report is generated with the SCM tool. For example, export parameters can be specified, and the SCM tool can produce a report that includes the list of software elements meeting criteria specified in the export parameters.

At 2420, the report can be used to determine and build the storage sub-areas in preparation for export. So, for example, the back-end tool can examine the report to determine the different types of software elements, projects, or both that are going to be exported, and create or erase respective sub-areas for the software elements.

At 2430, the report can be used to build a software element list. The process can include formulating instructions to the SCM tool, telling it which software elements to export and where (e.g., the name of the sub-area) the software elements are to be exported.

At 2440, the software element list is submitted to the SCM tool, which follows the instructions provided by the back-end tool.

At 2450, the elements are exported (e.g., by the SCM tool) to the appropriate storage sub-areas.

Any of the other features described herein (e.g., an audit report) can be incorporated into the method 2400.

EXAMPLE 43

Exemplary Application of Technologies: Refreshing Code

The technologies described herein can be used to periodically refresh modified code to be analyzed by a software logic analysis tool. Such an arrangement can provide significant productivity improvement, reduced defects, faster turn-around time, and the like.

Having the latest code to analyze is a prerequisite for doing reliable analysis. Without the technologies described herein, development teams can spend considerable effort refreshing the code. Due to the effort and time involved, some teams might not even perform the update. Thus, the quality of analysis is impacted, and major issues can result in later stages of the project.

Without the automated techniques described herein, manual error can be introduced into the process (e.g., downloading in the wrong format).

The cost of obtaining other tools, such as an FTP software can be avoided by using the techniques described herein.

The techniques described herein can also avoid problems associated with timeout (e.g., when downloading a large number of files) due to automatically downloading files on a file-by-file basis (e.g., via separate file transfer commands) if desired.

EXAMPLE 44

Exemplary Advantage: Automation Versus Manual Update

A manual update of code elements can be achieved via the following steps: identifying changed elements and their types, creating sub-areas (e.g., partitioned data sets), creating instructions for a software configuration management tool to export the elements, placing the exported elements into the partitioned data sets, and then downloading the files to a code server. An automated approach can involve simply submitting a mainframe job and then using the front-end tool to download the files.

A reduction in time spent achieving the process can be reduced from two days to four hours for a medium application. Due to refreshing only modified elements, any time savings is multiplied when updating a software logic analyzer because, in addition to export and download, the software logic analyzer needs to import the files.

Due to experiencing timeouts when downloading a large number of elements, developers may address the timeout problem by separately downloading each set of elements. The developer must wait for each set of elements to finish, and may accidentally skip or otherwise miss one of the element types.

Because no manual interface is required, the techniques can be executed during off-hours when load on the computing environment and network is minimal, thus reducing chances of timeout and reduced download time.

EXAMPLE 45

Exemplary Advantage: Versus Full Update

The technologies described herein can be used for an incremental update of code. For example, only those elements changed in the last n days need to be exported and downloaded. Such an approach can save considerable time. In one scenario, about 3,000 elements were involved in a project, exporting and downloading only the modified elements (about 150) reduced the total refresh time from 40 hours to 8 hours. Even in projects where only modified elements were being loaded, dramatic time savings were achieved (e.g., 10 minutes instead of 4 hours; 15 minutes instead of 3.5 hours).

EXAMPLE 46

Exemplary Mainframe Part of an Implementation to Update Software Elements

A mainframe tool (e.g., back-end tool) used to retrieve software elements from an ENDEVOR environment can be distributed as a JCL procedure. The input parameters to the software can be provided via symbolic parameters listed in the JCL procedure. Such parameters can include the following:

ENV—ENDEVOR environment from which the "Element activity profile" report was pulled.

INPUT—Dataset name of the ENDEVOR "Element activity profile" report.

OUTPUT—Name of the dataset to which the mainframe tool should write the SCL.

PDSNAME—High-level Qualifier(s) for the partitioned data sets to which the retrieved elements are to be copied.

REPORT—Name of the dataset to which the report giving details of elements downloaded is to be written.

DYNMAX—DYNAMNBR parameter that decides the number of partitioned data sets allocated for element retrieval (e.g., a value of 100 allows an allocation of about 100 data sets).

The following statement in proc "CDSEEKER.proc" can be updated with the actual PDS of the load library of the load modules CDSEEKR1, CDSEEKR2, and CDSEEKR3:

//STEPLIB DD DSN=TEST.CODE.SEEKER.BATLOAD1

The layout of input for generating a list of elements in an ENDEVOR report:

REPORT 04.
ENVIRONMENT EnvName.
SYSTEM SystemName.
SUBSYSTEM SubSystemName.
STAGE n.
DAYS NoOfDaysToExtractElements Specify NoOfDaysToExtractElements bigger than when the first element for the application was added to the system to download all elements for the application.

Installation of the mainframe tool can be accomplished as follows:

1. Create Executable on mainframe: Using COBOL programs CDSEEKR1.cbl, CDSEEKR2.cbl, and CDSEEKR3.cbl and link cards cdseeker1.lcd, cdseeker2.lcd, and cdseeker3.lcd, create executables.

2. Create input file: upload "select_Sample.file" on the mainframe. This will be used to provide input criteria.

3. JCL and Procs: Copy INCDSEEKjcl in a JCL library and CDSEEKER.proc, NDVRRPT.proc and SUBSCL.proc in a PROC library. Modify INCDSEEKjcl to refer to PROC library. Modify PROCs to refer to location of load modules created in step 1.

4. Running the mainframe tool: JCL INCDSEEK will be used to run the mainframe part. Different people need to create their own versions of INCDSEEK JCL with permanent settings and Input file mentioned in step 2 above to run the tool. PROCs and Load Modules will be used commonly.

Running the Mainframe Part of the Tools

In this example, the ALLFUSION ENDEVOR "Element activity profile" report is the input to the back-end tool. Guidelines for creating the report are as follows:

The report gives the details of the elements on which any action has been taken during a given time period. The basic inputs to the report are as follows:

1. Environment
2. System
3. Subsystem
4. Stage
5. Time period (in days)
6. Search environment map (Set to "no" or the report may contain duplicate entries)

Other additional information that can be passed to the mainframe tool is detailed as below:

1. The ENDEVOR environment from which the "Element activity profile" report was pulled.

2. The high-level qualifier for the partitioned data sets to which the elements have to be retrieved.

Using the report, the mainframe tool can generate the SCL and create the partitioned data sets with the following naming convention:

<<Qualifier passed>>.<<ENDEVOR system name>>.<<ENDEVOR element type>>

The mainframe can also create a report that lists the number of elements of a particular ENDEVOR type to be retrieved, along with the name of the PDS to which the elements will be copied when the SCL is executed. The user can use the report to verify the count of elements that would be copied to the corresponding PDS.

To achieve download of all elements, a number of days bigger than the number of days in which the first element was added for the system can be specified as report input criteria. All elements for the application will be downloaded.

EXAMPLE 47

Exemplary Front-End Tool of an Implementation to Update Software Elements

A front-end tool can be used in combination with the above example.

Installing the Front-End Tool

Installation can be achieved by copying an install file to a folder and running an installation utility (e.g., setup.exe). Installation can also be achieved by copying an executable of the tool (e.g., tool.exe) and a configuration file (e.g., tool.ini) into the same directory (e.g., c:\tool).

Running the Front-End Tool

Execution can be achieved by executing the executable. The following description is provided with reference to FIG. 21:

1. Application: For adding a new application in the drop down list, click on the graphical Add button and type the application's name. In the pictured implementation, the application name should be the same as the system name in the ENDEVOR software. For existing applications, select the application from the drop down menu.
2. Code Server Location: Browse to select the location where the code will be downloaded. A high level directory is recommended, inside which sub-directories with different element types should reside. In the pictured implementation, sub-directories should have the same name as the respective element type in the ENDEVOR software. In the example, elements will not be downloaded if the element type on the LAN does not match that on the mainframe.
3. Mainframe location: Enter a mainframe high level qualifier (do not include the application name). Files will be downloaded from the following mainframe PDS:

<HighLevelQualifier>.<ApplicationNameSelectedAbove>.<ElementTypeSelectedBelow>

4. Save Settings: Press the graphical "Save Settings" button to save the information entered above. "Code Server Location" and "Mainframe Location" will be auto filled with the application as selected from the drop down menu the next time.
5. Elements: This will show the different element types. The option is provided to select just one element type download or multiple element types download. To download files for all element types, click on the "SelectAllElements" option.
6. Select another application if desired to download multiple applications
7. Press "Download" (e.g., after selecting the applications desired).
8. Enter log-on credentials on the next screen, and download will start. Files for the different element types (e.g., and projects) will be downloaded to different sub-areas (e.g., directories).
9. A log window will be displayed showing the directory information from where the elements are being downloaded. It also shows the elements being downloaded.
10. After download is complete, a window will be shown indicating completion. A window with a graphical OK button can be presented. Click on OK to come out of the application.

EXAMPLE 48

Exemplary Alternative Description of the Mainframe Side

The following can be performed to export (e.g., retrieve) elements from ENDEVOR software on the mainframe, which have been modified in the last n days:

1. The "Element activity profile" report of the ENDEVOR software is the input to the back-end tool. The report can be generated using parameters passed by the user (ENDEVOR environment, system, subsystem, stage, and n).
2. Using the report as input, a list of elements modified in the last n days is extracted in a file, which contains the necessary ENDEVOR information associated with the element (e.g., environment, system, subsystem, element type).
3. Using the file generated in #2, a structured control language (SCL) request is created to retrieve the elements from ENDEVOR system in the user-specified PDS.
4. Any existing PDS for the element type is deleted and a new PDS is created with the following naming convention:

<High Level Qualifier>.<Application Name>.<Element Type>

5. The file created in #3 is in turn used to submit the SCL request to the ENDEVOR system to export the elements into different PDSs for different element types using the following naming convention:

<High Level Qualifier>.<Application Name>.<Element Type>

6. A report is also generated, which gives the user the number of elements (of the respective types) extracted from the ENDEVOR system into the respective different PDSs.

EXAMPLE 49

Exemplary Computing Environment for LAN Side

Figure 25:
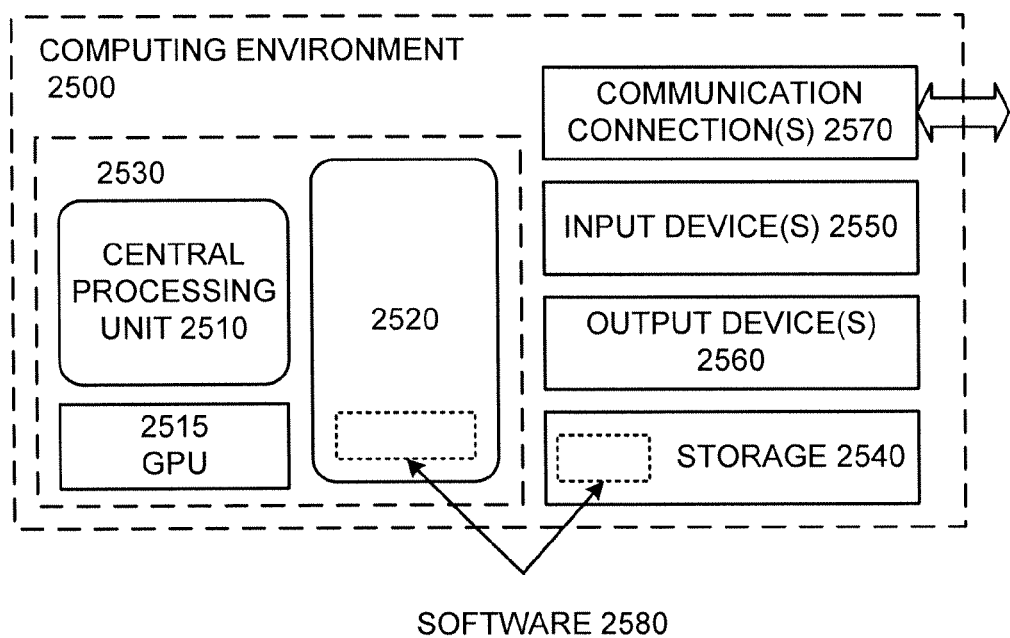
FIG. 25 is a block diagram of an exemplary suitable computing environment for implementing any of the technologies described herein.

FIG. 25 illustrates a generalized example of a suitable computing environment 2500 in which the described techniques on the LAN side can be implemented. The computing environment 2500 is not intended to suggest any limitation as to scope of use or functionality, as the technologies may be implemented in diverse general-purpose or special-purpose computing environments. A mainframe environment will be different from that shown, but also has computer-readable media, one or more processors, and the like.

With reference to FIG. 25, the computing environment 2500 includes at least one processing unit 2510 and memory 2520. In FIG. 25, this most basic configuration 2530 is included within a dashed line. The processing unit 2510 executes computer-executable instructions and may be a real or a virtual processor. In a multi-processing system, multiple processing units execute computer-executable instructions to increase processing power. The memory 2520 may be volatile memory (e.g., registers, cache, RAM), non-volatile memory (e.g., ROM, EEPROM, flash memory, etc.), or some combination of the two. The memory 2520 can store software 2580 implementing any of the technologies described herein.

A computing environment may have additional features. For example, the computing environment 2500 includes storage 2540, one or more input devices 2550, one or more output devices 2560, and one or more communication connections 2570. An interconnection mechanism (not shown) such as a bus, controller, or network interconnects the components of the computing environment 2500. Typically, operating system software (not shown) provides an operating environment for other software executing in the computing environment 2500, and coordinates activities of the components of the computing environment 2500.

The storage 2540 may be removable or non-removable, and includes magnetic disks, magnetic tapes or cassettes, CD-ROMs, CD-RWs, DVDs, or any other computer-readable media which can be used to store information and which can be accessed within the computing environment 2500. The storage 2540 can store software 2580 containing instructions for any of the technologies described herein.

The input device(s) 2550 may be a touch input device such as a keyboard, mouse, pen, or trackball, a voice input device, a scanning device, or another device that provides input to the computing environment 2500. For audio, the input device(s) 2550 may be a sound card or similar device that accepts audio input in analog or digital form, or a CD-ROM reader that provides audio samples to the computing environment. The output device(s) 2560 may be a display, printer, speaker, CD-writer, or another device that provides output from the computing environment 2500.

The communication connection(s) 2570 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media).

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A computer-implemented method of retrieving software elements on a mainframe to a local area network for importation to a software logic analyzer, the method comprising:
    the mainframe receiving export parameters, the export parameters comprising at least three selected from the group consisting of a project indicator, an intermediate storage area indicator, an element type indicator, and an element modification time limit;
    the mainframe generating a report indicating one or more software elements that meet one or more criteria specified in the export parameters, the software elements comprising at least three selected from the group consisting of source code, a copybook, a control card, a bind card, and a job control language file;
    the mainframe, responsive to a command received at the mainframe, exporting the indicated software elements from a software configuration management tool on the mainframe into a plurality of sub-areas in an intermediate storage area of the mainframe, wherein the sub-areas correspond to respective partitioned data sets on the mainframe and were created based at least in part on the report; and
    downloading the indicated software elements from the plurality of sub-areas in the intermediate storage area of the mainframe to respective sub-areas in a storage area residing on one or more hard disks in the local area network and accessible to the software logic analyzer.

2. One or more computer-readable storage media comprising computer-executable instructions configured to cause a mainframe to perform the method of claim 1.

3. The method of claim 1, further comprising:
    displaying a list of a plurality of software element type names;
    accepting a user selection of one or more of the software element type names; and
    limiting the downloading to software element types respective of the one or more of the software element type names selected.

4. The method of claim 1 wherein:
    the downloading comprises issuing at least one separate download command for a software element in one of the plurality of sub-areas in the intermediate storage area, wherein there are a plurality of software elements in the one of the plurality of sub-areas in the intermediate storage area.

5. The method of claim 1, the plurality of sub-areas in the intermediate storage area being a first plurality of sub-areas in the intermediate storage area and the respective sub-areas in the local area network being first respective sub-areas in the local area network, the method further comprising:
    downloading the software elements from a second plurality of sub-areas of the mainframe to second respective sub-areas in the local area network.

6. The method of claim 1 further comprising:
    presenting a plurality of project names in a user interface; and
    receiving a user selection of a selected plurality of project names out of the plurality of project names;
    wherein the downloading downloads the software elements for a plurality of projects associated with the selected plurality of the project names.

7. The method of claim 1 wherein the exporting exports the indicated software elements for a plurality of projects as specified in the export parameters.

8. A computer-implemented method of downloading a plurality of files corresponding to software elements of mainframe software stored in separate sub-areas in an intermediate storage area of the mainframe, the sub-areas corresponding to partitioned data sets, the downloading being for importation of the plurality of files to a software logic analyzer analyzing at least one of the files, the method comprising:

during a first execution of a front-end tool, responsive to an indication received in a user interface of the front-end tool, saving, for a next time the front-end tool is executed, download settings indicating files to be downloaded from the mainframe, wherein the download settings indicate at least a location of the intermediate storage area of the mainframe and a location of a storage area in a local area network, wherein the storage area in the local area network resides on one or more hard disks;

during the next time the front-end tool is executed, retrieving the download settings indicating files to be downloaded from the mainframe, wherein the download settings indicate at least the location of the intermediate storage area of the mainframe and the location of the storage area in the local area network;

via a user interface of the front-end tool, receiving an indication to download; and responsive to receiving the indication to download, downloading the plurality of files stored in the separate sub-areas corresponding to the partitioned data sets in the intermediate storage area of the mainframe indicated by the download settings to respective separate sub-areas in the storage area in the local area network on the one or more hard disks as indicated by the download settings, the separate sub-areas in the intermediate storage area of the mainframe having been created based at least in part on a report indicating which software elements meet criteria specified in export settings, the software elements comprising at least three selected from the group consisting of source code, a copybook, a control card, a bind card, and a job control language file, and the export settings comprising at least three selected from the group consisting of a project indicator, an intermediate storage area indicator, an element type indicator, and an element modification time limit.

9. One or more computer-readable storage media having computer-executable instructions configured to cause a computer to perform the method of claim 8.

10. The method of claim 8 further comprising:
retrieving the download settings via a name identifying download settings, the download settings having previously been saved with the name via the user interface.

11. The method of claim 10 further comprising:
receiving a user selection of the name from a drop down menu showing a plurality of names.

12. The method of claim 8 wherein the download settings comprise a high-level qualifier and a project name, the method further comprising:
determining the location of the intermediate storage area of the mainframe via the high-level qualifier and the project name.

13. The method of claim 8 wherein the separate sub-areas in the intermediate storage area separately store software elements of respective software element types as files, the method further comprising:
determining locations of the separate sub-areas in the intermediate storage area via respective names of the software element types.

14. The method of claim 13 wherein:
the download settings comprise a high-level qualifier and a project name; and the determining additionally determines the locations of the separate sub-areas in the intermediate storage area of the mainframe via the high-level qualifier and the project name.

15. The method of claim 8 further comprising: accepting user edits of the download settings; and changing the download settings according to the user edits.

16. The method of claim 8 further comprising:
presenting a list of a plurality of software element type names;
accepting a user selection of one or more of the software element type names; and
limiting the downloading to sub-areas in the intermediate storage area corresponding to respective of the one or more software element type names selected.

17. The method of claim 8 further comprising:
importing the downloaded files to the software logic analyzer, wherein the software logic analyzer distinguishes the files as different software elements via the separate sub-areas in the storage area of the local area network.

18. The method of claim 8 further comprising:
exporting a plurality of software elements from a software configuration management tool on the mainframe to the separate sub-areas in the intermediate storage location of the mainframe;
wherein the exporting places the software elements as files in different of the separate sub-areas based on respective types of the software elements.

19. The method of claim 18 wherein the exporting is performed by the software configuration management tool responsive to receiving a list of software elements to be exported generated by a software tool on the mainframe.

20. The method of claim 18 further comprising:
receiving the export settings; and
generating the report indicating which software elements meet criteria specified in the export settings.

21. The method of claim 18 further comprising:
receiving the export settings, wherein the export settings comprise the element modification time limit; and
limiting export to those software elements modified within the element modification time limit.

22. One or more computer-readable storage media comprising computer-executable instructions configured to cause a computer to perform a method comprising:
exporting, from a software configuration management tool, a plurality of software elements meeting specified export criteria, wherein the software elements are separated into separate partitioned data sets on a mainframe computer system, the separate partitioned data sets having been created based at least in part on a report describing the plurality of software elements meeting specified export criteria;
erasing at least one additional partitioned data set based at least in part on the report, the export criteria comprising three or more selected from the group consisting of a project indicator, an intermediate storage area indicator, an element type indicator, and an element modification time limit, and the software elements comprising three or more selected from the group consisting of source code, a copybook, a control card, a bind card, and a job control language file; and
downloading the software elements separated into the separate partitioned data sets to a remote computer.

23. An apparatus comprising:
storage means configured to store an indication of a software project of a mainframe computer system;

file transfer means configured to transfer a plurality of files for the software project of the mainframe computer system from sub-storage areas of the mainframe computer system to a code server on a local area network, the plurality of files comprising three or more selected from a group consisting of source code, a copybook, a control card, a bind card, and a job control language file; and report generating means for generating a description of the plurality of files to transfer from the mainframe computer system to the code server on the local area network, the description being generated based at least in part on export settings, the export settings comprising at least three selected from the group consisting of a project indicator, an intermediate storage area indicator, an element type indicator, and an element modification time limit, the sub-storage areas of the mainframe computer being configured at least in part according to the description of the plurality of files to transfer.

24. The method of claim 8 wherein:
the mainframe comprises a large data processing system.

25. The method of claim 24 wherein:
the software project comprises software executable on the mainframe under a mainframe operating system.

* * * * *